(12) United States Patent
Dutta

(10) Patent No.: US 11,675,596 B2
(45) Date of Patent: *Jun. 13, 2023

(54) DYNAMIC CONTROL OF PROCESSOR INSTRUCTION SETS

(71) Applicant: Nokia Solutions and Networks Oy, Espoo (FI)

(72) Inventor: Pranjal Kumar Dutta, Sunnyvale, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 65 days.

This patent is subject to a terminal disclaimer.

(21) Appl. No.: 17/089,085

(22) Filed: Nov. 4, 2020

(65) Prior Publication Data
US 2021/0049017 A1 Feb. 18, 2021

Related U.S. Application Data

(63) Continuation of application No. 16/503,828, filed on Jul. 5, 2019, now Pat. No. 10,860,325.

(51) Int. Cl.
*G06F 9/30* (2018.01)
*G06F 9/38* (2018.01)
*G06F 9/54* (2006.01)
*H04L 51/06* (2022.01)

(52) U.S. Cl.
CPC ........ *G06F 9/3851* (2013.01); *G06F 9/30181* (2013.01); *G06F 9/546* (2013.01); *H04L 51/06* (2013.01)

(58) Field of Classification Search
CPC .... G06F 9/3851; G06F 9/30181; G06F 9/546; G06F 9/5077; H04L 51/06; H04L 49/35; H04L 45/64; Y02D 10/00
See application file for complete search history.

(56) References Cited

U.S. PATENT DOCUMENTS

| | | | |
|---|---|---|---|
| 6,754,223 B1 | 6/2004 | Lussier | |
| 7,584,286 B2 | 9/2009 | Goglin | |
| 2005/0021874 A1 | 1/2005 | Georgiou | |
| 2014/0226661 A1 | 8/2014 | Mekkattuparamban et al. | |
| 2015/0010000 A1 | 1/2015 | Zhang et al. | |

OTHER PUBLICATIONS

ETSI, "Network Functions Virtualisation (NFV)—NFV Performance & Portability Best Practises," ETSI Draft, European Telecommunications Standards Institute (ETSI), vol. V0.0.9, Apr. 25, 2014, pp. 1-62.
McKeown, N., et al., "OpenFlow: Enabling Innovation in Campus Networks," AGM SIGCOMM Computer Communication Review, vol. 38, No. 2, Apr. 1, 2008, pp. 69-74.
EP Search Report mailed in counterpart EP Application No. 20174810.0 dated Apr. 5, 2023, 7 pages.

*Primary Examiner* — Corey S Faherty
(74) *Attorney, Agent, or Firm* — Tong, Rea, Bentley & Kim, LLC

(57) ABSTRACT

Various example embodiments for supporting message processing are presented. Various example embodiments for supporting message processing are configured to support message processing by a processor. Various example embodiments for supporting message processing by a processor are configured to support message processing by the processor based on dynamic control over processor instruction sets of the processor.

15 Claims, 43 Drawing Sheets

FIG. 8A

```
                            Packet P1
                               |
   Determine incoming port type by looking up the port specific states.
//If incoming port is ethernet than process ethernet layer.
if (incoming port is ethernet) ~ 801
{
      Eth_Hdr = parse ethernet header from P1.
      Do all ethernet layer processing that includes looking up relevant
      tables for vlan tags (if included in Eth_Hdr), learn source MAC
      Address, lookup of destination MAC address in relevant table for
      forwarding of packet.
      ......
      //If the packet needs to be forwarded then this means ethernet
      //switching only and the packet needs to be sent to egress.
      //else, means ethernet layer is terminated and needs to process
      //layer 3 to make a forwarding decision.
      if (destination MAC address is not local) ~ 802
      {
            To_Egress_Hdr = fill the parameters for egress to
                                  unicast/multicast/broadcast the packet based on
                                  Eth_Hdr.
            Strip_Hdrs = Fill in info on headers to strip (e.g., vlan tag,
                              etc.) before sending packets to egress.

goto send_packet_to egress; ~ 803
      }
      else
      {
            L3_protocol = Eth_Hdr->ethertype;
            Strip_Hdrs = Eth_Hdr;
            goto process_layer_3;            ~ 804
      }
}

// If incoming port type is Packet Over SONET (POS) then process the
// POS layer
else if (incoming port is pos)
{
      Pos_Hdr = parse POS header L3_protocol = POS_Hdr->protocol;
      Strip Hdrs = POS Hdr;

goto process_layer_3;

```
process_layer_3:

if (l3_protocol is IPv4)  ~ 805
    {
        // Parse IPV4 Header.
        IPv4_Hdr = Parse IPv4 Header from P1.

Do all IPv4 layer processing based on IPv4_Hdr. Few examples below:

1. Evaluate checksum for sanity of IPv4 Header.

2. If the destination address in IPv4 Header is multicast then
           lookup relevant multicast group specific tables and fill in
           forwarding information for egress.
        if (Destination Address in IPv4_Hdr is Multicast Group Address)
        {
            To_Egress_Hdr = Fill in packet type as IPv4 + multicast
                            replication parameters to egress.

goto send_packet_to_egress;

}

3. If not multicast, then look up the destination IP address in
           relevant unicast route tables to make forwarding decision.

// From the lookups, if destination IP address is local.
        if (destination IP address is local)
        {
            l4_protocol = IPv4_Hdr->Protocol;
            Strip_Hdrs += IPv4_Hdr;

goto process_layer_4;
        }

//If not local then fill in unicast forwarding information to egress.
        To_Egress_Hdr = Fill in packet type as IPv4 + unicast next-hop
                        information + TTL + TOS/DSCP etc for egress.
        goto send_packet_to_egress;

```
else if (l3_protocol is IPv6) ~ 806
{
    //Parse IPv6 Header.
    IPv6_Hdr = Parse IPv6 Header from P1.

Do all IPv6 layer processing based on IPv6_Hdr. Few examples below:

1. If the destination address in IPv6 Header is multicast then
       lookup relevant multicast group specific tables and fill in
       forwarding information for egress.
    if (Destination Address in IPv6_Hdr is Multicast Group Address)
    {
        To_Egress_Hdr = Fill in packet type as ipv6 + multicast
                        replication parameters to egress.

goto send_packet_to_egress;

}

C   2. If not multicast, then lookup the destination IP address in
       relevant unicast route tables to make forwarding decision.

// From the lookups, if destination IP address is local.
    if (destination IP address is local)
    {
        l4_protocol = IPv6_Hdr->NextHdr;
        Strip_Hdrs += IPv6Hdr;

goto protocol_layer_4;
    }

// If not local then fill in unicast forwarding information to
    // egress.
    To_Egress_Hdr = Fill in unicast next-hop information, Hop-limit,
                    TOS/DSCP etc for egress.
    goto send_packet_to_egress;
}
```

*FIG. 8D*

```
else if (l3_protocol is MPLS) ~ 807
{
    // This is processing MPLS layer.
    current_Label = Parse the top label;
process_current_label:

Lookup the Current_Label in ILM (Incoming Label Map) Table to get
    the forwarding context.

if (ILM_Entry says forward to a next-hop)
    {
        To_Egress_Hdr = fill in packet type MPLS + next-hop
        forwarding information
        Strip_Hdrs += current_label;

goto send_packet_to_egress;
    }

Means pop the current label and make further forwarding
    decision based on its payload.

Strip_Hdrs += current_label;

if (has more labels after current label)
    {
        //Make forwarding decision based on next label.
        Current_label = next label after current label;

goto process_current_label;
    }

Means no more labels after the current_label. So make decision
    based on current label.

if (ILM entry is IPv4_VPN) ~ 808
    {
        VPN_IPv4_Hdr = Parse IPv4 Hdr after current_label
        Do all IPV4 VPN processing based on VPN_IPv4_Hdr
        To_Egress_Hdr = fill in packet type ipv4 + VPN context +
                        next-hop forwarding information such as
                        GRE/MPLS tunnelling related information etc.
    }
```

FIG. 8E

```
        else if (...)
        {

}
    } process_layer_4:

Do all processing for Layer 4 here.

Return;
```

```
send_packet_to_egress:

//Strip the required headers before forwarding to egress.
        P1 = P1 - Strip_Hdrs;
        // Prepend the meta header to egress onto P1.
        P1 = to_Egress_Hdr + P1

Enqueue P1 to egress.

.../// .....

//End of ING.
      Return;
```

COMMON FOR ALL FEATURES

FIG. 9A

```
                    PACKET P1
                        |
            To_Egress_Hdr = Remove the to_Egress_Hdr from P1
            P1 = P1 - to_Egress_Hdr;  ~ 901
COMMON  ⎧   ..../....
  902   ⎩   Do common processing required for any packet if (to_Egress_Hdr->packet_type is ethernet) ~ 903
            {
                Mapped to A if (to_Egress_Hdr->cast_type is multicast or broadcast) ~ 905
                {
                    for each port in to_Egress_Hdr->port_list
                    {
                        Do all processing on the packet required to send the
                        ethernet packet on this port such as - lookup port specific
                        states, add vlan tags, mark: dot1p/de markings in vlan tag
                        etc.

Send P1 on the port.

A                    return;
  904                }
                }
                else
                {
                    Do all processing on the packet required to send the ethernet
                    packet on to_Egress_Hdr->port such as - lookup
                    port specific states, add vlan tags, mark dot1p/de markings in
                    vlan tag etc.

Send P1 on the to_Egress_Hdr->port.

return;
                }
            }
```

*FIG. 9B*

If (to_Egress_Hdr->next_hop->type is ipv6) ~ 906

C 907
{
   Mapped to C
   egress_interface, egress_port, layer_2_encap =
   Resolve ipv6 next-hop address to the interface, port and
   layer-2 encap by ipv6 ND (neighbour Discovery) table lookup
   etc.
}
else B 908
{
   Mapped to B
   egress_interface, egress_port, layer_2_encap =
   Resolve ipv4 next-hop address to the interface, port and
   layer_2 encap by ipv4 ARP lookup etc.
}

COMMON 409
Do all common processing related to egress_interface such as:
- apply ACLs (Access Control Lists) on egress_interface
- qos_params = Pick up QoS params from egress_interface if (to_Egress_Hdr->packet_type is ipv4) ~ 910

B 912
{
   Do all processing in ipv4 header in P1 such as
   - Update TTL
   - Update TOS/DSCP fields in ipv4 header based om qos_params.
   - Update header checksum.
}
else if (to_Egress_Hdr->packet_type is ipv6) ~ 911

C 913
{
   Do all processing to forward the ipv6 header in P1 such as-
   - Update hop limit
   - Update traffic class fields in ipv6 header if needed
}

FIG. 9C

```
         if (to_Egress_Hdr->is_vpn is true) ⁓ 914
         {
            if (to_Egress_Hdr->packet_type is ipv4) ⁓ 915
    E(917) {
               Mapped to E
               Do VPN specific processing on IPV4 Header
            }
            else
    F(918) {
               Mapped to F
               Do VPN specific processing on IPV6 Header
            }
E+F
916     (919) {
            Do all common processing for VPN such as finding VPN related
            encap (i.e. label etc) and tunnelling information by looking
            up tables associated with (to_Egress_Hdr->vpn_identifier,
            to_Egress_Hdr->vpn_next_hop)
            - vpn_encap = VPN related encap
            - vpn_tunnelling_info = Tunnelling information for VPN packet
         }
         P1 = P1 + vpn_encap ⁓ 920 if (vpn_tunnelling_info->type is MPLS) ⁓ 921
         {
             egress_mpls_info = vpn_tunnelling_info->mpls
             goto mpls_encap;
         }
         else
         {
             ..
         }
      }
```

FIG. 9D

```
      else if (to_Egress_Hdr->packet_type is MPLS) ─ 922
      {
         Mapped to D
         egress_mpls_info = to_Egress_Hdr->mpls_nexthop_info;

mpls encap: Do all processing related to MPLS tunnelling of the packet such as
D        addition of encaps etc.
923      mpls_tunnel_encap = Lookup tables with indices in egress_mpls_info
                                  to retrieve the MPLS labels for the next-hop.
         P1 = P1 + mpls_tunnel_encap
      }

..../.....

//Do some common processing ─ 923

COMMON   .../.....
927
         P1 = P1 + Layer_2_encap ─ 925

..../....
         Add port specific tags such as VLAN etc if needed. ─ 926 send P1 on egress_port ─ 928 return;
```

FIG. 10A

Active_EGR_Pointer = LO@EGR ─────┐  P1
                                                                             │

```
    To_Egress_Hdr = Remove the to_Egress_Hdr from P1
    P1 = P1 - to_Egress_Hdr;

..../....
    Do common processing required for any packet if (to_Egress_Hdr->packet_type is ethernet)  ← 1003
    {
        if (to_Egress_Hdr->cast_type is multicast or broadcast)
        {
            for each port in to_Egress_Hdr->port_list
            {
                Do all processing on the packet required to send to the
                ethernet packet on this port such as - lookup port specific
                states, add vlan tags, mark dot1p/de markings in vlan tag
                etc.

Send P1 on the port..

Return;
            }
        }
    }
```

FIG. 10B

```
    else
    {
        Do all processing on the packet required to send the ethernet
        packet on the to_Egress_Hdr->port such as - lookup
        port specific states, add vlan tags, mark dot1p/de markings in
        vlan tag etc.
        Send P1 on the to_Egress_Hdr->port.
        return;
    }
}
if (to_Egress_Hdr->next_hop->type is ipv6)  ⟋ 1006
{
    Mapped to C              ⟋ 1007
    switch_level (P1, L2, true);
}
else
{
    Mapped to B              ⟋ 1008
    switch_level (P1, L1, true);
}
return;
```

FIG. 11

```
switch_level (packet, next_level, is_egress)
{
    if (is_egress)
    {
        Active_EGR_Pointer = Base_Pointer (next_level@EGR);
        Active_EGR_Pointer (packet);
    }
    else
    {
        Active_ING_Pointer = Base_Pointer = Base_Pointer (next_level@ING)
        Active_ING_Pointer (packet);
    }
}
```

FIG. 13A

```
                                    P1
Active_EGR_Pointer = L1@EGR ─┐      │
                             To_Egress_Hdr = Remove the to_Egress_Hdr from P1
                             P1 = P1 - to_Egress_Hdr;

..../....
                             Do common processing required for any packet if (to_Egress_Hdr->packet_type is ethernet)
    {
        if (to_Egress_Hdr->cast_type is multicast or broadcast)
        {
            for each port in to_Egress_Hdr->port_list
            {
                Do all processing on the packet required to send the
                ethernet packet on this port such as - lookup port specific
                states, add vlan tags, mark dotlp/de markings in vlan tag
                etc.

Send P1 on the port.

return;
            }
        }
        else
        {
            Do all processing on the packet required to send the ethernet
            packet on the to_Egress_Hdr->port such as - lookup
            port specific states, add vlan tags, mark dotlp/de markings in
            vlan tag etc.

Send P1 on the to_Egress_Hdr->port.

return;
        }
    }
    if (to_Egress_Hdr->next_hop->type is ipv6)
    {
        Mapped to C
        switch_level (P1, L2, true);  ── 1307
    }
    else
    {
        egress_interface, egress_port, layer_2_encap =
        Resolve ipv4 next-hop address to the interface, port and
        layer-2 encap by ipv4 ARP lookup etc.
    }
```

FIG. 13B

```
Do all common processing related to egress_interface such as:
- apply ACLs (Access Control Lists) on egress_interface
- qos_params = Pick up QoS params from egress_interface.

if (to_Egress_Hdr->packet_type is ipv4)
{
    Do all processing in ipv4 header in P1 such as-
    - Update TTL
    - Update TOS/DSCP fields in ipv4 header based on qos_params.
    - Update header checksum
}
else if (to_Egress_Hdr->packet_type is ipv6) ⟵ 1311
{
    Mapped to C
    switch_level (P1, L2, true) ⟵ 1312 return;

} if (to_Egress_Hdr->is_vpn is true) ⟵ 1314
{
    if (to_Egress_Hdr->packet_type is ipv4) ⟵ 1315
    {
        Mapped to E switch_level (P1, L4, true); ⟵ 1317 return;
}
```

FIG. 13C

```
    else
    {
        Mapped to F
        switch_level(P1, L5, true);  — 1318 return;
    }
}
else if (to_Egress_Hdr->packet_type is MPLS)  — 1322
{
    Mapped to D
    switch_level(P1, L3, true);  — 1319 return;
}
...../......
//Do some common processing
.../......
P1 = P1 + layer_2_encap
.../......
Add port specific tags such as VLAN etc if needed.
send P1 on egress_port
return;
```

FIG. 14A

```
To_Egress_Hdr = Remove the to_Egress_Hdr from P1

P1 = P1 - to_Egress_Hdr;
..../....
Do common processing required for any packet if (to_Egress_Hdr->packet_type is ethernet;
{
    if (to_Egress_Hdr->cast_type is multicast or broadcast)  — 1405
    {
        for each port in to_Egress_Hdr->port_list
        {
            Do all processing on the packet required to send the
            ethernet packet on this port such as - lookup port specific
            states, add vlan tags, mark dotlp/de markings in vlan tag
            etc.

Send P1 on the port.

return;
        }
    }
}
```

FIG. 14B

```
        else
        {
                Do all processing on the packet required to send the ethernet
                packet on the to_Egress_Hdr->port such as - lookup
                port specific states, add vlan tags, mark dot1p/de markings in
                vlan tag etc.

Send P1 on the to_Egress_Hdr->port.

return;
        }
} if (to_Egress_Hdr->next_hop->type is ipv6)
{
        egress_interface, egress_port, layer_2_encap =
        Resolve ipv6 next-hop address to the interface, port and
        layer-2 encap by ipv6 ND (Neighbour Discovery) table lookup
        etc.
}
else
{
        egress_interface, egress_port, layer_2_encap =
        Resolve ipv4 next-hop address to the interface, port and
        layer-2 encap by ipv4 ARP lookup etc.
}
```

FIG. 14C

```
Do all common processing related to egress_interface such as:
- apply ACLs (Access Control Lists) on egress_interface
- qos_params = Pick up QoS params from egress_interface.

if (to_Egress_Hdr->packet_type is ipv4)
{
    Do all processing in ipv4 header in P1 such as-
    - Update TTL
    - Update TOS/DSCP fields in ipv4 header based on qos_params.
    - Update header checksum.
}
else if (to_Egress_Hdr->packet_type is ipv6)
{
    Do all processing to forward the ipv6 header in P1 such as-
    - Update hop limit
    - Update traffic class fields in ipv6 header if needed }
if (to_Egress_Hdr->is_vpn is true) ⟋ 1414
{
    if (to_Egress_Hdr->packet_type is ipv4) ⟋ 1415
    {
        Mapped to E
        switch_level(P1, L4, true); ⟋ 1417 return;
    }
```

FIG. 14D

```
        else
        {
            Mapped to F
            switch_level (P1, L5, true);     ⟋ 1418
            return;
        }
    }
    else if (to_Egress_Hdr->packet_type is MPLS)  ⟋ 1422
    {
        Mapped to D
        switch_level (P1, L3, true);    ⟋ 1419
        return;
    }
    ...../.....
    // Do some common processing
    .../.....
    P1 = P1 + layer_2_encap
    ..../....
    Add port specific tags such as VLAN etc if needed.  ⟋ 1426
    send P1 on egress_port
    return;
```

FIG. 16A

```
Active_EGR_Pointer = L2@EGR ─┐         P1
                             │          ↓
    To_Egress_Hdr = Remove the to_Egress_Hdr from P1
    P1 = P1 = to_Egress_Hdr;

if (packet_counter == LEVEL_AUDIT_COUNT) ── 1613
    {
            max_audited_level = L2;

while (max_audited_level > L0)
            {
                    if (packet_counter_per_level [max_audited_level]
                                                        is not 0)
                    {
                        break;
                    } max_audited_level --;
            } if (max_audited_level is not L2) ── 1615
            {
                    switch_level (P1, max_audited_level, true);
                    return;
            }
            else
            {
                    packet_counter_per_level [ ] = 0;
                    packet_count = 0;
            }
    }
```

FIG. 16B

```
// Tracks max level hit by the packet. Initialize
// to invalid level 0XFFFF
max_hit_level = 0xFFFF  / 1601

..../....
Do common processing required for any packet if (to_Egress_Hdr->packet_type is ethernet) / 1602
{
    max_hit_level = L0; / 1603 if (to_Egress_Hdr->cast_type is multicast or broadcast)
    {
        for each port in to_Egress_Hdr->port_list
        {
            Do all processing on the packet required to send the
            ethernet packet on this port such as - lookup port
            specific states, add vlan tags, mark dot1p/de markings in vlan tag
            etc Send P1 on the port.
```

FIG. 16C

```
            packet_counter_per_level [max_hit_level]++;  ╱ 1604
            packet_counter++;  ╲ 1605
            return;

}
    }
    else
    {
        Do all processing on the packet required to send the
        ethernet packet on the to_Egress_Hdr->port such as - lookup
        port specific states, add vlan tags, mark dot1p/de
        markings in vlan tag etc.

Send P1 on the to_Egress_Hdr->port.

packet_counter_per_level [max_hit_level]++;  ╱ 1606 packet_counter++;  ╱ 1607 return;

```
if (to_Egress_Hdr->next_hop->type is ipv6) ⟋ 1608
{
        if (max_hit_level < L2)
        {
              max_hit_level = L2;
        } egress_interface, egress_port, layer_2_encap =
        Resolve ipv6 next_hop address to the interface, port and
        layer-2 encap by ipv6 ND (Neighbour Discovery) table
        lookup etc.
}
else
{
        if (max_hit_level <L1)
        {
              max_hit_level = L1;
        } egress_interface, egress_port, layer_2_encap =
        Resolve ipv4 next-hop address to the interface, port and
        layer-2 encap by ipv4 ARP lookup etc.
}

Do all common processing related to egress_interface such as:
- apply ACLs (Access Control Lists) on egress_interface
- qos params = Pick up QoS params from egress_interface.

if (to_Egress_Hdr->packet_type is ipv4) ⟋ 1609
{
    if (max_hit_level < L1)
    {
          max_hit_level = L1;
    }
```

FIG. 16E

```
            Do all processing in ipv4 header in P1 such as -
            - Update TTL
            - Update TOS/DSCP fields in ipv4 header based on qos_params.
            - Update header checksum.
    }
    else if (to_Egress_Hdr->packet_type is ipv6)
    {
            if (max_hit_level < L2)
            {
                max_hit_level = L2;
            }

Do all processing to forward the ipv6 header in P1 such as-
            - Update hop limit
            - Update traffic class fields in ipv6 header if needed
    }
    if (to_Egress_Hdr->is_vpn is true)   ⟋ 914
    {
        if (to_Egress_Hdr->packet_type is ipv4) ⟋ 915
        {
            Mapped to E
            switch_level (P1, L4, true);  ⟋ 917 return;
        }
        else
        {
            Mapped to F
            switch_level (P1, L5, true);  ⟋ 918 return;
        }
    }
}
```

FIG. 16F

```
else if (to_Egress_Hdr->packet_type is MPLS) ╱ 922
{
    Mapped to D
    switch_level (P1, L3, true); ╱ 919 return;
}

...../......
//Do some common processing
..../....

P1 = P1 + layer_2_encap

..../....
Add port specific tags such as VLAN etc if needed. ╱ 926 send P1 on egress_port

// In case packet didn't hit lower levels then packet must
// be at the max level supported by this instruction set,
// i.e. L2
if (max_hit_level is 0XFFFF) ╱ 1610

{
max_hit_level = L2;
}
packet_counter_per_level [max_hit_level] ++; ╱ 1611 packet_counter++; ╱ 1612 return;
```

FIG. 19

```
switch_level (packet, next_level, is_egress)
{
    if (is_egress)
    {
        // Reset packet counters used for downgrade of EGR levels as level is
        // getting switched.
        packet_counter@EGR=0;
        packet_counter_per_level [ ] @EGR = 0;
        Active_EGR_Pointer = Base_Pointer (next_level@EGR);

Active_EGR_Pointer (packet);

}
    else
    {
        // Reset packet counters used for downgrade of EGR levels as level is
        // getting switched.
        packet_counter@ING=0;
        packet_counter_per_level [ ] @ING = 0;

Active_ING_Pointer = Base_Pointer (next_level@ING);

Active_ING_Pointer (packet);
    }
}
```

*FIG. 21*

```
L0@Instruction_Set     Packet P1
        \                  |
            // Local variables
            X = 0, Y = 0;
            .....

// Lookup entry P1->X1 in forwarding table T2. The entry
            // is denoted as T2_Entry.
   1701 —   T2_Entry = Lookup T2 [P1-> PX1]
            .....

// Condition check on parameter TX10 in T2_Entry.
   1702 —   if (T2_Entry->TX10)
            {
   1703 ——————  P1->H1 = Prepend header H1 on P1
   1704 ——————  T8_Entry = Lookup T8 [T2_Entry->TX10]
   1705 ——————  X = T8_Entry->TX1 && P1->PX2
            }
            .....

1706 —   Y = T2_Entry->TX4 + P1->PX4;
            .....

1707 —   T5_Entry = Lookup T5 [X + Y]

1708 —   if (T5_Entry->TX1)
            {
   1709 ——————  Modify existing header H2 on P1

1710 ——————  T10_Entry = Lookup table T10 [R_T5->TX4]
   1711 ——————  X = X + R_T10->X3
            }
            ......
            ......

1712 —   T15_Entry = Lookup T15 [X + Y]

// condition1_for_B9 is the result of computations
            //based on previous forwarding state lookups and
            //the packet.
   1713 —   condition_1_for_B9 = T15_Entry->TX4

1714 —   if (condition_1_for_B9)
            {
                switch_level (P1, L1, ...)
                return
            }
```

FIG. 22

Configuration Summary Table

| index | Configuration Summary Table |
|---|---|
| 0 | XX config count=   ..., B9 config count=7 YY config count= |

T15

| index | T15 |
|---|---|
| 0 |  |
| 1 | TX4 = true |
| 2 |  |

| 1000 |  |
| 1001 | TX4 = true |
| ... |  |
| 4000 |  |

T32

| index | T32 |
|---|---|
| 0 |  |
| 1 | TX2 = true |
| 2 |  |

| 2000 | TX2 = true |
| 2001 |  |
| ... |  |
| 8000 | TX2 = true |

T52

| index | T52 |
|---|---|
| 0 |  |
| 1 | TX6 = true |
| 2 |  |

| 500 | TX6 = true |
| 501 |  |
| 1000 |  |

FIG. 23

```
L1@Instruction_Set        Packet P1
        \                     |
        // Local variables
        X = 0, Y = 0;
        .....

CST_Entry = Lookup CST[0]

if (CST_Entry->B9_config_count is non-zero)
        {
              switch_level (P1, L1, ...)
        }
        // Lookup entry P1->X1 in forwarding table T2. The entry
        // is denoted as T2_Entry.
2301 ──  T2_Entry = Lookup T2 [P1->PX1]
        .....

// Condition check on parameter TX10 in T2_Entry.
2302 ──  if (T2_Entry->TX10)
        {
2303 ──       P1->H1 = Prepend header H1 on P1
2304 ──       T8_Entry = Lookup T8 [T2_Entry->TX10]
2305 ──       X = T8_Entry->TX1 && P1->PX2
        }

.....
2306 ──  Y= T2_Entry->TX4 + P1->PX4;
        .....

2307 ──  T5_Entry = Lookup T5 [X + Y]

2308 ──  if (T5_Entry->TX1)
        {
2309 ──       Modify existing header H2 on P1

2310 ──       T10_Entry = Lookup table T10 [R_T5->TX4]
2311 ──       X = X + R_T10->X3
        }

.....
2312 ──  T15_Entry = Lookup T15 [X + Y]
```

DYNAMIC CONTROL OF PROCESSOR INSTRUCTION SETS

CROSS REFERENCE TO RELATED APPLICATIONS

This application is a continuation of U.S. patent application Ser. No. 16/503,828, filed on Jul. 5, 2019, entitled DYNAMIC CONTROL OF PROCESSOR INSTRUCTION SETS, which is hereby incorporated herein by reference in its entirety.

TECHNICAL FIELD

Various example embodiments relate generally to message processing and, more particularly but not exclusively, to packet processing in communication networks.

BACKGROUND

Message processing may be used within various contexts and for various purposes. For example, in communication networks, packet processing may be performed at various types of devices, such as routers, servers, end devices, and so forth.

SUMMARY

In at least some example embodiments, an apparatus includes a memory and a processor. The memory is configured to store a set of instruction sets configured to support respective sets of message processing feature sets, wherein the set of instruction sets includes a first instruction set configured to support a first set of message processing feature sets and a second instruction set configured to support a second set of message processing feature sets, wherein the second set of message processing feature sets includes the message processing feature sets of the first set of message processing feature sets. The processor is configured to process a message based on the set of instruction sets. In at least some example embodiments, the set of instruction sets is arranged in a hierarchy based on the respective sets of message processing feature sets such that, for a given one of the instruction sets that is at a given level of the hierarchy, the respective set of message processing feature sets supported by the given one of the instruction sets is a superset of the sets of message processing feature sets of any instruction sets at respective levels of the hierarchy below the given level of the hierarchy. In at least some example embodiments, the message is processed using the first instruction set based on a determination, during processing of the message, that a group of message processing features sets needed for processing the message is available from the first instruction set. In at least some example embodiments, the message is processed using the second instruction set based on a determination, during processing of the message, that a group of message processing features sets needed for processing the message is available from the second instruction set. In at least some example embodiments, the message is processed using the first instruction set and the second instruction set. In at least some example embodiments, the processor is configured to switch from processing the message using the first instruction set to processing the message using the second instruction set during processing of the message. In at least some example embodiments, the switch from processing the message using the first instruction set to processing the message using the second instruction set is based on processing of the message. In at least some example embodiments, the switch from processing the message using the first instruction set to processing the message using the second instruction set is based on a determination that a given message processing feature set needed for processing the message is available from second instruction set. In at least some example embodiments, the determination that the given message processing feature set needed for processing the message is available from second instruction set is made prior to modification of the message during processing of the message using the first instruction set. In at least some example embodiments, the processor is configured to control processing of the message based on an active instruction set of the processor that is active for processing messages. In at least some example embodiments, the active instruction set is identified based on use of a pointer configured to point to a location of the active instruction set in the memory. In at least some example embodiments, the active instruction set is controlled based on a determination, during processing of the message, of a given message processing feature set needed for processing the message. In at least some example embodiments, the given message processing feature set needed for processing the message is determined based on processing of the message. In at least some example embodiments, processing of the message is completed without modifying the active instruction set based on a determination, during processing of the message, that the given message processing feature set needed for processing the message is available from the active instruction set. In at least some example embodiments, the active instruction set is modified, during processing of the message, based on a determination that the given message processing feature set needed for processing the message is not available from the active instruction set. In at least some example embodiments, the active instruction set is modified prior to modification of the message. In at least some example embodiments, processing of the message is restarted after the active instruction set is modified. In at least some example embodiments, the active instruction set is controlled based on a set of packet counters. In at least some example embodiments, the active instruction set is switched from the second instruction set to the first instruction set based on the set of packet counters. In at least some example embodiments, the active instruction set is controlled based on a timer. In at least some example embodiments, the active instruction set is switched from the second instruction set to the first instruction set based on the timer, wherein the first instruction set is at a lowest level of a hierarchy of the set of instruction sets. In at least some example embodiments, the set of instruction sets is configured to support a packet processing application, wherein a first one of the instruction sets is configured to support processing of Ethernet packets and a second one of the instruction sets is configured to support processing of Internet Protocol (IP) packets.

In at least some example embodiments, a non-transitory computer-readable medium includes instructions configured to cause an apparatus to at least store, in a memory, a set of instruction sets and process, by a processor based on the set of instruction sets, a message, wherein the set of instruction sets is configured to support respective sets of message processing feature sets, wherein the set of instruction sets includes a first instruction set configured to support a first set of message processing feature sets and a second instruction set configured to support a second set of message processing feature sets, wherein the second set of message processing feature sets includes the message processing feature sets of the first set of message processing feature sets. In at least some example embodiments, the set of instruction sets is arranged in a hierarchy based on the respective sets of message processing feature sets such that, for a given one of the instruction sets that is at a given level of the hierarchy, the respective set of message processing feature sets supported by the given one of the instruction sets is a superset of the sets of message processing feature sets of any instruction sets at respective levels of the hierarchy below the given level of the hierarchy. In at least some example embodiments, the message is processed using the first instruction set based on a determination, during processing of the message, that a group of message processing features sets needed for processing the message is available from the first instruction set. In at least some example embodiments, the message is processed using the second instruction set based on a determination, during processing of the message, that a group of message processing features sets needed for processing the message is available from the second instruction set. In at least some example embodiments, the message is processed using the first instruction set and the second instruction set. In at least some example embodiments, the transitory computer-readable medium includes instructions configured to cause the apparatus to at least switch, by the processor, from processing the message using the first instruction set to processing the message using the second instruction set during processing of the message. In at least some example embodiments, the switch from processing the message using the first instruction set to processing the message using the second instruction set is based on processing of the message. In at least some example embodiments, the switch from processing the message using the first instruction set to processing the message using the second instruction set is based on a determination that a given message processing feature set needed for processing the message is available from second instruction set. In at least some example embodiments, the determination that the given message processing feature set needed for processing the message is available from second instruction set is made prior to modification of the message during processing of the message using the first instruction set. In at least some example embodiments, the transitory computer-readable medium includes instructions configured to cause the apparatus to at least control, by the processor, processing of the message based on an active instruction set of the processor that is active for processing messages. In at least some example embodiments, the active instruction set is identified based on use of a pointer configured to point to a location of the active instruction set in the memory. In at least some example embodiments, the active instruction set is controlled based on a determination, during processing of the message, of a given message processing feature set needed for processing the message. In at least some example embodiments, the given message processing feature set needed for processing the message is determined based on processing of the message. In at least some example embodiments, processing of the message is completed without modifying the active instruction set based on a determination, during processing of the message, that the given message processing feature set needed for processing the message is available from the active instruction set. In at least some example embodiments, the active instruction set is modified, during processing of the message, based on a determination that the given message processing feature set needed for processing the message is not available from the active instruction set. In at least some example embodiments, the active instruction set is modified prior to modification of the message. In at least some example embodiments, processing of the message is restarted after the active instruction set is modified. In at least some example embodiments, the active instruction set is controlled based on a set of packet counters. In at least some example embodiments, the active instruction set is switched from the second instruction set to the first instruction set based on the set of packet counters. In at least some example embodiments, the active instruction set is controlled based on a timer. In at least some example embodiments, the active instruction set is switched from the second instruction set to the first instruction set based on the timer, wherein the first instruction set is at a lowest level of a hierarchy of the set of instruction sets. In at least some example embodiments, the set of instruction sets is configured to support a packet processing application, wherein a first one of the instruction sets is configured to support processing of Ethernet packets and a second one of the instruction sets is configured to support processing of Internet Protocol (IP) packets.

In at least some example embodiments, a method includes storing, in a memory, a set of instruction sets and processing, by a processor based on the set of instruction sets, a message, wherein the set of instruction sets is configured to support respective sets of message processing feature sets, wherein the set of instruction sets includes a first instruction set configured to support a first set of message processing feature sets and a second instruction set configured to support a second set of message processing feature sets, wherein the second set of message processing feature sets includes the message processing feature sets of the first set of message processing feature sets. In at least some example embodiments, the set of instruction sets is arranged in a hierarchy based on the respective sets of message processing feature sets such that, for a given one of the instruction sets that is at a given level of the hierarchy, the respective set of message processing feature sets supported by the given one of the instruction sets is a superset of the sets of message processing feature sets of any instruction sets at respective levels of the hierarchy below the given level of the hierarchy. In at least some example embodiments, the message is processed using the first instruction set based on a determination, during processing of the message, that a group of message processing features sets needed for processing the message is available from the first instruction set. In at least some example embodiments, the message is processed using the second instruction set based on a determination, during processing of the message, that a group of message processing features sets needed for processing the message is available from the second instruction set. In at least some example embodiments, the message is processed using the first instruction set and the second instruction set. In at least some example embodiments, the method includes switching, by the processor, from processing the message using the first instruction set to processing the message using the second instruction set during processing of the message. In at least some example embodiments, the switch from processing the message using the first instruction set to processing the message using the second instruction set is based on processing of the message. In at least some example embodiments, the switch from processing the message using the first instruction set to processing the message using the second instruction set is based on a determination that a given message processing feature set needed for processing the message is available from second instruction set. In at least some example embodiments, the determination that the given message processing feature set needed for processing the message is available from second instruction set is made prior to modification of the message during processing of the message using the first instruction set. In at least some example embodiments, the method includes controlling, by the processor, processing of the message based on an active instruction set of the processor that is active for processing messages. In at least some example embodiments, the active instruction set is identified based on use of a pointer configured to point to a location of the active instruction set in the memory. In at least some example embodiments, the active instruction set is controlled based on a determination, during processing of the message, of a given message processing feature set needed for processing the message. In at least some example embodiments, the given message processing feature set needed for processing the message is determined based on processing of the message. In at least some example embodiments, processing of the message is completed without modifying the active instruction set based on a determination, during processing of the message, that the given message processing feature set needed for processing the message is available from the active instruction set. In at least some example embodiments, the active instruction set is modified, during processing of the message, based on a determination that the given message processing feature set needed for processing the message is not available from the active instruction set. In at least some example embodiments, the active instruction set is modified prior to modification of the message. In at least some example embodiments, processing of the message is restarted after the active instruction set is modified. In at least some example embodiments, the active instruction set is controlled based on a set of packet counters. In at least some example embodiments, the active instruction set is switched from the second instruction set to the first instruction set based on the set of packet counters. In at least some example embodiments, the active instruction set is controlled based on a timer. In at least some example embodiments, the active instruction set is switched from the second instruction set to the first instruction set based on the timer, wherein the first instruction set is at a lowest level of a hierarchy of the set of instruction sets. In at least some example embodiments, the set of instruction sets is configured to support a packet processing application, wherein a first one of the instruction sets is configured to support processing of Ethernet packets and a second one of the instruction sets is configured to support processing of Internet Protocol (IP) packets.

In at least some example embodiments, an apparatus includes means for storing a set of instruction sets and means for processing, based on the set of instruction sets, a message, wherein the set of instruction sets is configured to support respective sets of message processing feature sets, wherein the set of instruction sets includes a first instruction set configured to support a first set of message processing feature sets and a second instruction set configured to support a second set of message processing feature sets, wherein the second set of message processing feature sets includes the message processing feature sets of the first set of message processing feature sets. In at least some example embodiments, the set of instruction sets is arranged in a hierarchy based on the respective sets of message processing feature sets such that, for a given one of the instruction sets that is at a given level of the hierarchy, the respective set of message processing feature sets supported by the given one of the instruction sets is a superset of the sets of message processing feature sets of any instruction sets at respective levels of the hierarchy below the given level of the hierarchy. In at least some example embodiments, the message is processed using the first instruction set based on a determination, during processing of the message, that a group of message processing features sets needed for processing the message is available from the first instruction set. In at least some example embodiments, the message is processed using the second instruction set based on a determination, during processing of the message, that a group of message processing features sets needed for processing the message is available from the second instruction set. In at least some example embodiments, the message is processed using the first instruction set and the second instruction set. In at least some example embodiments, the apparatus includes means for switching from processing the message using the first instruction set to processing the message using the second instruction set during processing of the message. In at least some example embodiments, the switch from processing the message using the first instruction set to processing the message using the second instruction set is based on processing of the message. In at least some example embodiments, the switch from processing the message using the first instruction set to processing the message using the second instruction set is based on a determination that a given message processing feature set needed for processing the message is available from second instruction set. In at least some example embodiments, the determination that the given message processing feature set needed for processing the message is available from second instruction set is made prior to modification of the message during processing of the message using the first instruction set. In at least some example embodiments, the apparatus includes means for controlling processing of the message based on an active instruction set that is active for processing messages. In at least some example embodiments, the active instruction set is identified based on use of a pointer configured to point to a location of the active instruction set in the memory. In at least some example embodiments, the active instruction set is controlled based on a determination, during processing of the message, of a given message processing feature set needed for processing the message. In at least some example embodiments, the given message processing feature set needed for processing the message is determined based on processing of the message. In at least some example embodiments, processing of the message is completed without modifying the active instruction set based on a determination, during processing of the message, that the given message processing feature set needed for processing the message is available from the active instruction set. In at least some example embodiments, the active instruction set is modified, during processing of the message, based on a determination that the given message processing feature set needed for processing the message is not available from the active instruction set. In at least some example embodiments, the active instruction set is modified prior to modification of the message. In at least some example embodiments, processing of the message is restarted after the active instruction set is modified. In at least some example embodiments, the active instruction set is controlled based on a set of packet counters. In at least some example embodiments, the active instruction set is switched from the second instruction set to the first instruction set based on the set of packet counters. In at least some example embodiments, the active instruction set is controlled based on a timer. In at least some example embodiments, the active instruction set is switched from the second instruction set to the first instruction set based on the timer, wherein the first instruction set is at a lowest level of a hierarchy of the set of instruction sets. In at least some example embodiments, the set of instruction sets is configured to support a packet processing application, wherein a first one of the instruction sets is configured to support processing of Ethernet packets and a second one of the instruction sets is configured to support processing of Internet Protocol (IP) packets.

BRIEF DESCRIPTION OF THE DRAWINGS

The teachings herein can be readily understood by considering the following detailed description in conjunction with the accompanying drawings, in which:

FIGS. 8A-8E depict an example embodiment of high-level logic for processing a packet on an ingress side of a router based on dynamic control of instruction sets;

FIGS. 9A-9D depict an example embodiment of high-level logic for processing a packet on an egress side of a router based on dynamic control of instruction sets;

FIGS. 10A-10B depict an example embodiment of high-level logic of an instruction set, for an egress side of a router, configured to support packet processing and configured to support instruction set upgrades based on dynamic control of instruction sets;

FIG. 11 depicts an example embodiment of high-level logic for upgrading instruction sets during processing of a packet based on dynamic control of instruction sets;

FIGS. 13A-13C depict an example embodiment of high-level logic of an instruction set, for an egress side of a router, configured to support packet processing and configured to support instruction set upgrades based on dynamic control of instruction sets;

FIGS. 14A-14D depict an example embodiment of high-level logic of an instruction set, for an egress side of a router, configured to support packet processing and configured to support instruction set upgrades based on dynamic control of instruction sets;

FIGS. 16A-16F depict an example embodiment of high-level logic of an instruction set, for an egress side of a router, configured to support packet processing and configured to support instruction set downgrades based on dynamic control of instruction sets;

FIG. 19 depicts an example embodiment of high-level logic for downgrading instruction sets during processing of a packet based on dynamic control of instruction sets;

FIG. 21 depicts an example embodiment of high-level logic for processing a packet on ingress and egress sides of a router based on dynamic control of instruction sets without using a configuration summary table;

FIG. 22 depicts an example embodiment of a configuration summary table for use with the example embodiment of high-level logic of FIG. 21;

FIG. 23 depicts an example embodiment of high-level logic for processing a packet on ingress and egress sides of a router based on dynamic control of instruction sets using a configuration summary table;

To facilitate understanding, identical reference numerals have been used, where possible, to designate identical elements that are common to the figures.

DETAILED DESCRIPTION

Figure 1:
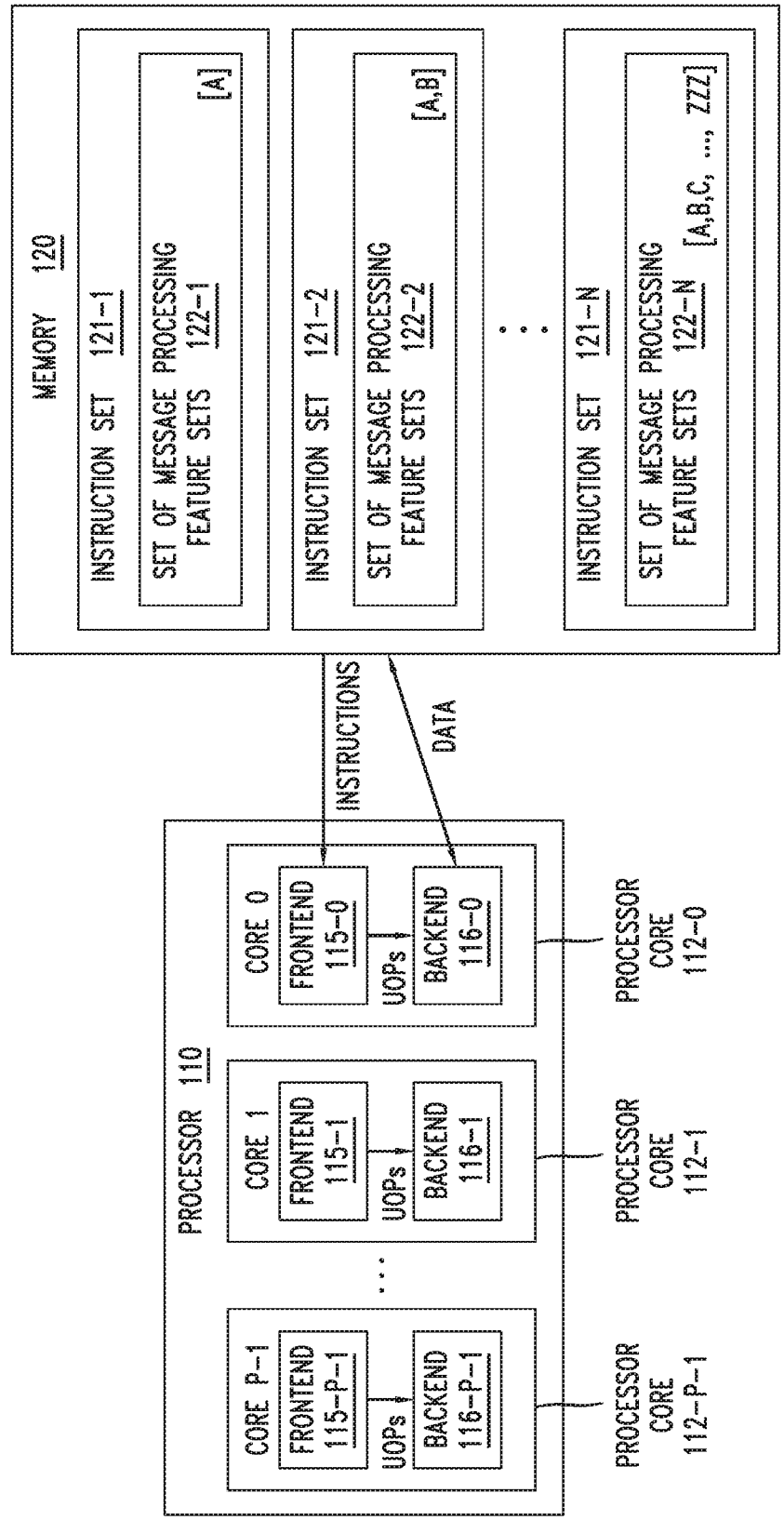
FIG. 1 depicts an example embodiment of a device configured to support message processing by a processor based on dynamic control of instruction sets used by the processor for message processing.

Various example embodiments for supporting message processing are presented. Various example embodiments for supporting message processing are configured to support message processing by a processor. Various example embodiments for supporting message processing by a processor are configured to support message processing by the processor based on dynamic control over processor instruction sets of the processor. Various example embodiments for supporting message processing by the processor based on dynamic control over processor instruction sets of the processor may be configured to support a memory that is configured to store a set of instruction sets configured to support respective sets of message processing feature sets, wherein the set of instruction sets includes a first instruction set configured to support a first set of message processing feature sets and a second instruction set configured to support a second set of message processing feature sets, wherein the second set of message processing feature sets includes the message processing feature sets of the first set of message processing feature sets, and a processor that is configured to process a message based on the set of instruction sets. Various example embodiments for supporting message processing by the processor based on dynamic control over processor instruction sets of the processor may be configured to support a memory that is configured to store a plurality of instruction sets configured to support respective sets of message processing features, wherein the instruction sets are arranged in a hierarchy based on the sets of message processing features such that, for a first one of the instruction sets that is higher in the hierarchy than a second one of the instruction sets, the respective set of message processing features supported by the first one of the instruction sets includes the set of message processing features supported by the second one of the instruction sets, and a processor that is configured to process a message using at least one of the instruction sets. Various example embodiments for supporting message processing by a processor are configured to support processing of packets by a network processor of a communication network and, more particularly but not exclusively, to support processing of packets by a forwarding plane of a network processor of a communication network. It will be appreciated that, although primarily presented herein within the context of example embodiments for supporting processing of a particular type of message (namely, a packet having a header and a payload and which may be communicated using one or more communications protocols) using a particular type of processor architecture (namely, a multi-core processor architecture) supporting a particular type of network processing architecture (namely, a network processing architecture in which the ingress packet processing functions and egress processing functions are handled separately using respective groups of instruction sets), various example embodiments for supporting message processing by a processor may be configured to support message processing for other types of messages, may be configured to support message processing using other types of processor architectures (e.g., using a single-core processor), may be configured to support message processing using other types of network processing architectures (e.g., using a network processing architecture in which the ingress packet processing functions and egress processing functions are handled together using a common group of instruction sets), or the like, as well as various combinations thereof. It will be appreciated that these and various other example embodiments and advantages or potential advantages of supporting message processing may be further understood by way of reference to the various figures, which are discussed further below.

Various example embodiments are related to high performance packet forwarding by network processors in routers. Various example embodiments are configured to support packet forwarding by routers configured to support network function virtualization (NFV), which may be referred to as NFV-based routers. In general, NFV-based routers typically use general-purpose, off-the-shelf servers to implement a routing system, where such servers are based on general-purpose processors (e.g., x86, MIPS, ARM, or the like) configured to function as the network processors providing forwarding engines for NFV-based routers. Various example embodiments may be configured to address various challenges to building a high-performance forwarding engine in a general-purpose processor, since such processors typically are not designed to meet various stringent requirements imposed by high performance routers. On the other hand, the NFV market typically demands high-performance forwarding by NFV routers in order to reduce operational expenses and capital expenses. Accordingly, various embodiments presented herein are configured to provide an NFV solution configured to extract improved or even optimum forwarding performance out of general-purpose processors. Additionally, it will be appreciated that, although primarily discussed within the context of NFV router, various example embodiments presented herein may be configured to extract improved or even optimum forwarding performance out of general-purpose processors which may be configured to perform processing in various other contexts (e.g., other types of packet forwarding processing, other types of message processing, other types of processing, or the like, as well as various combinations thereof). It will be appreciated that these and various other example embodiments and advantages or potential advantages of supporting message processing may be further understood by way of reference to the various figures, which are discussed further below.

FIG. 1 depicts an example embodiment of a device configured to support message processing by a processor based on dynamic control of instruction sets used by the processor for message processing.

As depicted in FIG. 1, the device 100 includes a processor 110 and a memory 120 that is communicatively connected to the processor 110. The device 100 is configured to support message processing as discussed herein. For example, the device 100 may be a router, a server, or any other type of device which may perform message processing.

The processor 110 is configured to be the main processor of the device and may be referred to as the central processor unit (CPU) of the device 100 or using other suitable terminology for describing the role of the processor 110 within the device 100.

The processor 110 is a multi-core processor including multiple processor cores 112-1 to 112-C (collectively, processor cores 112). It will be appreciated that each processor core 112 of processor 110 is configured to operate as an individual processor within the processor 110 (e.g., by executing its own program at any given point in time). In general, a processor core 112 of the processor 110 may read instructions of its assigned program from the memory 120 and execute the instructions and, further, reads operands of instructions (input data) from memory and outputs of instructions (output data) are written back to memory. It will be appreciated that, in most cases, writing back of output data to input-output (I/O) units (e.g., peripherals such as network interface cards (NICs), storage disks, and so forth) may be seen as writing to memory since most of the state-of-the-art I/O units are mapped as regions in memory. In general, a processor core 112 of the processor 110 can execute more than one instruction during a clock cycle by simultaneously dispatching multiple instructions to different execution units on the processor core 112, where the processor core 112 executes instructions in an order governed by the availability of input data and executions units, rather than by the original order of the instructions in the program. In this manner, the processor core 112 can avoid being idle while waiting for the preceding instruction to complete and can, in the meantime, process the next instructions that are able to run immediately and independently. This method of executing instructions, which is often called out-of-order execution, allows for more throughput (the number of instructions that can be executed in a unit of time) than would otherwise be possible at a given clock rate of the processor core 112.

The processor 110 is configured to operate based on a micro-architecture configured to provide an implementation of an Instruction Set Architecture (ISA) for the processor 110. In general, an ISA of a processor is an abstract model provided by a processor to the programs executed by the processor. The ISA defines the supported data types, the memory model and registers and their semantics (such as memory consistency and addressing modes), the instruction set, and the input/output model. In general, the micro-architecture of a processor is the way in which a given ISA is implemented in a processor. The micro-architecture includes the building blocks and the electrical circuitry to implement the required logic of the building blocks. A given ISA may be implemented with different micro-architectures, which may vary in performance, physical size, cost, power consumption, and so forth. Thus, the ISA serves as the interface between the program and the processor and a program that has been written for an ISA can run on different micro-architectures of the same ISA. This capability has enabled program compatibility between different generations of processors. For example, x86 is one such ISA which is implemented by many state-of-the-art processors available from various processor providers. In x86, for example, the length of the instructions is variable (e.g., the length of x86 instructions can vary from 1B to 15B, where the simplest instructions can be encoded using 1B whereas instructions involving complex operations can be encoded using multiple bytes up to 15B). The micro-architecture of a processor core 112, however, cannot execute the variable length instructions of an ISA in their native form; rather, at the micro-architectural level of the processor core 112, instructions are represented by simpler, fixed-length micro-operations (which may be referred to as micro-ops, or UOPs). The variable-length ISA instructions are broken down into sequences of fixed-length UOPs, where the UOPs perform basic operations on data stored in one or more registers, including transferring data between registers or between registers and external buses, performing arithmetic and logical operations on registers, and so forth. For example, the add-register-to-memory instruction may be broken down into a sequence of separate load, add, and store UOPs. As such, generally speaking, instructions are dynamically decoded by the processor core 112 to UOPs and, after dynamically decoding the instructions to UOPs, the processor core issues and executes the UOPs.

The processor 110 is configured to operate as an out-of-order super scalar processor. In the processor 110, each processor core 112 includes an instruction pipeline, such that instructions go through multiple stages in order to be executed by the by the processor core 112. The stages are called a pipeline of the processor core 112. The first part of the pipeline is responsible for fetching instructions from an instruction store/memory. In a processor core 112, the stages in the pipeline from fetching of instructions until the dynamic decoding of the instructions to UOPs are referred to as the frontend of the processor core 112 and the remaining stages in the pipeline (renaming, execution, and retiring) that process in units of UOPs are referred to as the backend of the processor core. In a processor core 112, the backend of the processor core 112 can execute multiple UOPs per clock cycle and, as a result, efficiency in the frontend of the processor core 112 (e.g., efficiency of decoding the instructions to UOPs and supplying the UOPs to the backend with low-latency and high bandwidth) is important for the performance of the processor 112 and, thus, for efficiency of the processor 110 as a whole. As illustrated in FIG. 1, the processor cores 112-1-112-C include frontends 115-1-115-C (collectively, frontends 115) and backends 116-1-116-C (collectively, backends 116), respectively. The micro-architectural components in the frontend 115 of a processor core 112 may be further understood with respect to FIG. 2.

The memory 120 is configured to store a plurality of instruction sets 121-1 to 121-N (collectively, instruction sets 121) configured to support respective sets of message processing feature sets 122-1 to 122-N (collectively, sets of message processing feature sets 122) where each of the message processing feature sets may include one or more message processing features.

The instruction sets 121 are arranged in a hierarchy based on the sets of message processing features sets 122. The instruction sets 121 are arranged in a hierarchy based on the sets of message processing feature sets 122 such that, for a given instruction set 121-x at a given level of the hierarchy, the associated set of message processing feature sets 122-x supported by the given instruction set 121-x is a superset of the message processing feature sets 122 associated with any instruction sets 121 lower in the hierarchy while also including one or more message processing feature sets defined for the given instruction set 121-x. This is illustrated in FIG. 1 using letters or letter combinations (e.g., A, B, ZZZ, and so forth) to refer to individual message processing feature sets which may be included in the sets of message processing feature sets 122. For example, instruction set 121-1 is the most basic instruction set (lowest level of the hierarchy) and its associated set of message processing feature sets 122-1 that includes message processing feature set A. For example, instruction set 121-2 is at the next highest level of the hierarchy and its associated set of message processing feature sets 122-2 that includes the message processing feature sets supported by any instruction sets lower in the hierarchy (illustratively, message processing feature set A of instruction set 121-1) as well as any message processing feature sets defined for instruction set 121-2 (illustratively, message processing feature set B). For example, instruction set 121-3 is at the next highest level of the hierarchy and its associated set of message processing feature sets 122-3 includes the message processing feature sets supported by any instruction sets lower in the hierarchy (illustratively, message processing feature set A of instruction set 121-1 and message processing feature set B of instruction set 121-2, which also may be considered to be message processing features sets A and B of instruction set 121-2) as well as any message processing feature sets defined for instruction set 121-2 (illustratively, message processing feature set C). The hierarchy of instruction sets continues in this manner until the instruction set 121-N at the highest level of the hierarchy, which includes the message processing feature sets 122 supported by each of the other instruction sets 121 the hierarchy (i.e., the message processing feature sets 122 supported by instruction sets 121-1 through 121-N−1, which also may be considered to be the message processing feature sets 122 of instruction set 121-N−1, which includes message processing feature sets A through ZZZ).

It will be appreciated that a set of message processing feature sets 122-x may include one or more message processing feature sets (illustratively, the set of message processing feature sets 121-1 of instruction set 121-1 includes only one message processing feature set (namely, message processing feature set A) while each of the other message processing feature sets 122-2 through 122-N associated with each of the other instruction sets 121-2 through 121-N may include multiple message processing feature sets).

It will be appreciated that each of the message processing feature sets may include one or more message processing features and that different message processing feature sets may include the same or different numbers of message processing features and, further, that, for each of the sets of message processing feature sets 122, the set of message processing feature sets 122 may be considered to include each of the message processing features of each of the message processing feature sets in the set of message processing feature sets 122, respectively. For example, message processing feature set A that is included in each of the sets of message processing feature sets 122-1 through 122-N of instruction sets 121-1 through 121-N may include k message processing features (e.g., message processing feature set A={A1, A2, . . . Ak}, such that each of the sets of message processing feature sets 122-1 through 122-N of instruction sets 121-1 through 121-N includes each of the message processing features {A1, A2, . . . Ak}. Similarly, for example, message processing feature set B that is included in each of the sets of message processing feature sets 122-2 through 122-N of instruction sets 121-1 through 121-N may include m message processing features (e.g., message processing feature set A={B1, B2, . . . Bm}, such that each of the sets of message processing feature sets 122-2 through 122-N of instruction sets 121-2 through 121-N includes each of the message processing features {A1, A2, . . . Ak, B1, B2, . . . Bm}. In this manner, supersets of message processing features sets, and the message processing features of those message processing features sets, may be defined with increasing levels of the hierarchy.

It will be appreciated that, although primarily presented, for purposes of clarity, with respect to an example in which only a single additional message processing feature set is defined at each level of the hierarchy, any suitable number of message processing feature sets may be defined at any level of the hierarchy (e.g., the set of message processing feature sets 122 for the instruction set 121 at the lowest level of the hierarchy may support message processing feature sets A, B, and C, the set of message processing feature sets 122 for the instruction set 121 at the next highest level of the hierarchy may support message processing feature sets A, B, C, and D, the set of message processing feature sets for the instruction set at the next highest level of the hierarchy may support message processing feature sets A, B, C, D, E, F, and G, and so forth).

It will be appreciated that, in at least some embodiments, the levels of the hierarchy may be considered to be different versions of the max level instruction set that includes all feature sets. For example, assume that level L5 is the max level and the max level instruction set contains feature sets A, B, C, D, and E. In this example, for level L4, a version of the max level instruction set may be compiled out by switching off all code for feature set E. Similarly, in this example, for level L3, a version of the max level instruction set may be compiled out by switching off all code for feature sets D and E. Accordingly, in at least some embodiments, the instruction sets 121 may be considered to be different instruction sets (e.g., including different source code to be compiled for different features sets supported by the different instruction sets), different versions of an given instruction set (e.g., max level instruction set configured to provide all feature sets for a given application, such as ING or EGR), or the like.

It will be appreciated that, in at least some embodiments, the instruction sets 121 may correspond to the source code (e.g., C, C++, or the like, as well as various combinations thereof) to be compiled in order to obtain the resultant machine code (e.g., x86 code or the like) that is executable on the processor. It will be appreciated that, in at least some embodiments, while the source code used to provide a given feature set (e.g., A, B, C, and so forth) may be the same in the different instruction sets 121 that support the given feature (it is noted that it also could be different), the resultant machine code resulting from compiling of the different instruction sets 121 may be different (e.g., since the compiler may optimize the source code differently in the presence/absence of other features).

The device 100 is configured such that the processor 110 processes messages using the instruction sets 121. The device 100 is configured such that only one of the instruction sets 121, referred to as the active instruction set 121-*a*, is active at a given time. The processor 110 begins processing a message using the active instruction set 121-*a* that is active when processing of the message begins. The processing of the message using the active instruction set 121-*a* is performed using the set of message processing feature sets 122-*a* supported by the active instruction set 121-*a*. The processor 110 determines, during processing of the message using the active instruction set 121-*a*, a mapped instruction set 121-*m* for the message where the mapped instruction set 121-*m* for the message is one of the instruction sets 121 supporting the set of message processing feature sets 122 determined to be needed for processing the message. The processing of the message using the active instruction set 121-*a* may result in modification of the message and the processor determines the mapped instruction set 121-*m* for the message prior to modification of the message based on processing of the message using the active instruction set 121-*a*. The processor 110, based on a determination that the mapped instruction set 121-*m* for the message and the active instruction set 121-*a* are the same instruction set 121, completes processing of the message using the active instruction set 121-*a* (since the active instruction set 121-*a* is the instruction set 121 supporting the proper set of message processing feature sets 122 needed for successful processing of the message). The processor 110, based on a determination that the mapped instruction set 121-*m* for the message and the active instruction set 121-*a* are different instruction sets 121, initiates a switch of the active instruction set 121-*a* from the one of the instruction sets 121 that is active for the processor 110 when processing of the message begins to the mapped instruction set 121-*m* for the message (since the mapped instruction set 121-*m* is the instruction set 121 supporting the proper set of message processing feature sets 122 needed for successful processing of the message) and then restarts processing of the message using the active instruction set 121-*a* (which, again, is now the mapped instruction set 121-*m* determined for the message). In other words, the processor 110 is configured to dynamically select, based on the message, one of the instruction sets 121 to be used for processing the message and to process the message using the selected one of the instruction sets 121 (where it will be appreciated that multiple such dynamic determinations may be performed during processing of the message in order to dynamically move through the hierarchy of instruction sets 121 to activate and use the instruction set 121 having the set of message processing feature sets 122 needed for successful processing of the message). The processor 110 may be configured to switch from a selected one of the instruction sets 121 (e.g., one of the instruction sets 121 active when processing of the message begins) to a newly selected one of the instruction sets 121 (e.g., a mapped instruction set determined for the message). The processor 110 may be configured such that the switch from the selected one of the instruction sets 121 to the newly selected one of the instruction sets 121 is based on processing of the message. The processor 110 may be configured such that the switch from the selected one of the instruction sets 121 to the newly selected one of the instruction sets 121 is based on a determination that a given set of message processing feature sets 122 needed for processing the message is available from the newly selected one of the instruction sets 121 (e.g., the newly selected one of the instruction sets 121 is at a higher level of the hierarchy than the selected one of the instruction sets 121). The processor 110 may be configured such that the switch from the selected one of the instruction sets 121 to the newly selected one of the instruction sets 121 is based on use of a set of packet counters (e.g., the newly selected one of the instruction sets 121 is at a lower level of the hierarchy than the selected one of the instruction sets 121). The processor 110 may be configured such that the switch from the selected one of the instruction sets 121 to the newly selected one of the instruction sets 121 is based on use of a periodic timer (e.g., for resetting the active instruction set 121-a to the instruction set 121 at the lowest level of the hierarchy of instruction sets 121).

It will be appreciated that the device 100 may be used within various contexts for processing various types of messages; however, for purpose of clarity in describing various aspects of various embodiments, device 100 is primarily described herein within the context of supporting a packet processing application (e.g., where the processor 110 is configured to use different instruction sets 121 having different sets of message processing feature sets 122 for processing different types of packets which may be received (e.g., Ethernet packets, IPv4 packets, IPv6 packets, and so forth).

It will be appreciated that, although primarily presented herein within the context of a multi-core processor including a specific number of processor cores, various example embodiments presented herein may be configured for use in a processor having fewer or more processor cores.

It will be appreciated that, although primarily presented herein within the context of a multi-core processor, various example embodiments presented herein may be configured for use in a processor having a single processor core.

Figure 2:
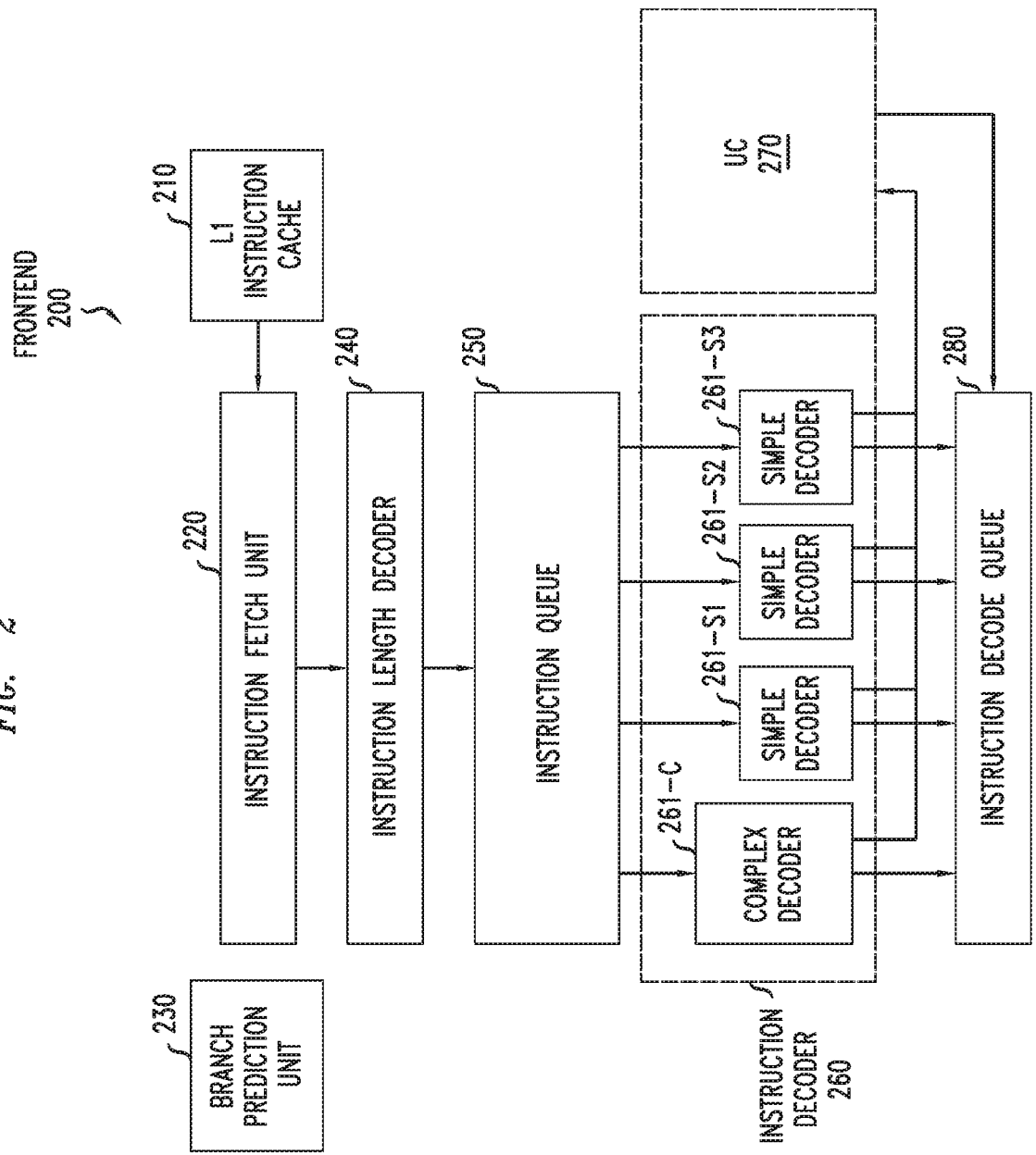
FIG. 2 depicts an example embodiment of a frontend of a processor core of a processor configured to support message processing based on dynamic control of instruction sets used by the processor for message processing.

FIG. 2 depicts an example embodiment of a frontend of a processor core of a processor configured to support message processing based on dynamic control of instruction sets used by the processor for message processing. It will be appreciated that the frontend 200 of FIG. 2 may be used as a frontend 115 of a processor core 112 of the processor 110 of the device 100 of FIG. 1.

The frontend 200 of FIG. 2 includes a level 1 (L1) instruction cache (L1-IC) 210, an instruction fetch unit (IFU) 220, a branch prediction unit (BPU) 230, an instruction length decoder (ILD) 240, an instruction queue (IQ) 250, an instruction decoder (ID) 260, a UOP cache (UC) 270, and an instruction decoder queue (IDQ) 280.

The L1-IC 210 is a cache that is part of the cache hierarchy of the associated processor and may be further understood by considering the cache hierarchy of processors and the cache arrangement of caches.

In general, a cache is a smaller, faster memory, closer to a processor, which stores copies of the program data or program instructions from frequently used memory locations to reduce the average cost of access (time or energy). The data or program instructions are stored in the cache by blocks of contiguous memory locations, typically referred to as cache lines, where each cache line is indexed in the cache by the first memory address in the cache line. Caches benefit from the temporal and spatial locality of memory access patterns in a program, where spatial locality refers to use of relatively close memory locations (i.e., within a cache line) and temporal locality refers to the reuse of specific cache line within a relatively small time duration. Many processors use multiple levels of caches. For example, a common processor architecture might utilize at least three levels (L) of caches, which are typically referred to as L1, L2, and L3. The L1 cache is the smallest and nearest to the processor and, thus, faster than the other cache levels. Typically, the L1 cache is split into two portions: the L1 Instruction Cache (e.g., 32 KB is size, although other sizes may be used) which holds only program instructions and the L1 Data Cache (e.g., 32 KB in size, although other sizes may be used) which holds only program data. The L2 cache (e.g., 256 KB in size, although other sizes may be used) and the L3 cache (e.g., 2 MB in size, although other sizes may be used) are the subsequent levels which are usually unified caches (meaning that they hold both instructions and program data). The L3 cache typically is common for the processor cores in a multi-core processor and, thus, is located outside of the processor cores. It will be appreciated that the cache size and access latency grow according to the levels. If the cache line corresponding to a memory address sought is missing in the L1 cache, then the processor looks up in subsequent levels of caches (e.g., L2 cache, then L3 cache, and so forth). If the memory address is missing in all of the available cache levels, then the processor can access the main memory to retrieve the instruction or data at the memory address. So main memory is accessed only if the memory address is missing in all caches. The missing block, once located, is brought into a cache line in the L1 cache.

In general, a cache is typically organized as set associative array, which can be imagined as M×N matrix. The cache is divided into M sets and each set contains N cache lines. To place a memory block into the cache, its address is typically segregated into 3 fields—tag, index, offset. A memory block is first mapped into a set based on 'index bits' derived from the address of the memory block. Then the memory block is placed into a cache line in the set and a 'tag' is stored in the cache line. The tag is composed of the bits in the address of the memory block (other than the index bits) that can distinguish between the cache lines sharing the same set. The offset field refers to any address within a cache line. The offset field is composed of a few least significant bits of the address and the number of bits is dependent on the size of the cache line. For example, if the cache line size is 64B, then the 6 least significant bits of the addresses are the offset bits. Here, the term Instruction Pointer (IP) is used to denote the memory address of an instruction, and the 3 fields of an IP that are used to map a block of instructions into a cache are referred to as IP-tag, IP-index, and IP-offset. If all cache lines in a set are occupied while trying to store a new memory block, then an existing cache line in the set is evicted (a replacement policy picks which cache line to evict) to make way for the new memory block. When the evicted cache line is accessed later, then it will result in a miss in the cache and, thus, will need to be brought back into the cache from the memory hierarchy. Such misses are referred to as conflict misses and repeated conflict misses due to collisions between cache lines sharing the same set is referred to as thrashing.

The IFU 220 is responsible for feeding the processor with instructions to execute, and thus, it is the first component where instructions are processed. The IFU 220 mainly includes the required logic to compute the next fetch address and then fetch the instructions from the L1-IC 210. The instructions are fetched from the L1-IC 210 by the IFU 220 in streams of raw bytes.

The BPU 230 is configured to predict the next fetch address for the IFU 220, because otherwise branch instructions introduce a significant extra level of complexity in fetching streams of instructions, since the correct fetch address cannot be calculated until the branch instruction itself is executed. By default, instructions are processed by a processor sequentially. This sequential execution can be disrupted by the control instructions (e.g., conditional branches, unconditional branches, subroutine calls and subroutine returns, and so forth) to start executing an instruction sequence starting at a new address (the target address). For example, JE (Jump If Equal) is an example of a conditional branch instruction in x86. A conditional branch is data-dependent (e.g., value of a data acts as the condition) and branches to the target address only if the condition is true. For example, instructions such as CALL, RET, and JUMP are examples of a subroutine call, a subroutine return, and an unconditional branch, respectively, in x86. Any control instruction other than conditional branch instruction will switch the execution sequence to the target address specified in the instruction. Herein, the target instruction sequence of a control instruction is referred to generally as a control block. Execution of a program can be viewed as executing a chain of certain control blocks. Herein, an order of execution of control blocks in a program is referred to as a control flow (i.e., flow of control). Conditional branches (e.g., JE) can generate multiple control flows in a program since every such branch is a fork and the execution can go either way on the fork based on the condition of the fork. Control instructions introduce significant extra complexity in fetching streams of instructions, since the correct fetch address after the control instruction cannot be calculated until the backend executes the control instruction itself. For this reason, the frontend of high-performance processors (namely, the BPU 230) predicts the next fetch address and speculatively starts fetching from the predicted address. There are two parts in this prediction. The first is predicting the direction of the branch taken by the control instruction, i.e., taken to the target sequence or not taken. The second part is predicting the target address of a branch. Once the direction of a branch is predicted, then the memory address of the control instruction and its predicted target address is stored in a Branch Target Buffer (BTB), which is a cache organized similar to the set associative array described in the context of L1-IC 210.

The ILD 240 provides a pre-decode phase. The ILD 240 separates the raw byte stream from IFU 220 into a sequence of valid instructions and passes them to the IQ 250. For example, as indicated above, the length of an x86 instruction may vary between 1B to 15B and may reside in any byte address in program memory, thus, requiring segregation of the raw byte stream into instructions of variable lengths. Decoding the length of several instructions per cycle adds a level of complexity, since the start addresses have to be speculatively determined. That is, the fact that the starting address of the second instruction is not known until the first instruction is decoded and its length computed, imposes serialization of the length decoding process, and parallelizing this requires determining the length of each instruction before decoding it. The ILD 240 provides complex logic, based on many parallel and speculative computations, to help achieve such parallelization (although this comes at the price of increased power consumption).

The IQ 250 queues the instructions for the instructions decode phase. The IQ 250 queues the instructions, after the ILD 240 separates the instructions from the stream of raw bytes, for use by ID 260 in the instructions decode phase.

The ID 260 provides the instructions decode phase (which also may be referred to as a dynamic translation phase). In this phase, instructions are read from the IQ 205 and translated into subsequent functionally-equivalent UOPs. This translation is performed by one of several decoders in a set of decoders 261 including a complex decoder 261-C and three simple decoders 261-S1-261-S3 (although it will be appreciated that fewer or more instruction decoders may be used). Herein, the ID 260, including the set of decoders 261, also may be referred to as a Micro Instruction Translation Engine (MITE). The resultant UOPs are passed by the ID 260 to the IDQ 280, through which the UOPs may then enter the backend of the processor. For example, in an x86-based processor, simple instructions can translate into 1-4 UOPs and complex instructions can translate into 5 or more UOPs. It will be appreciated that for processors based on other ISAs, instructions may be translated into other numbers of UOPs.

The UC 270, generally speaking, is a UOP cache that is configured to cache UOPs for instructions previously decoded by the MITE, thereby obviating a need for the MITE to re-decode instructions previously decoded by the MITE in order to obtain the associated UOPs (namely, avoiding the L1-IC→IFU→ILD→MITE decode path). This type of cache may be referred to as an L0 Instruction Cache (L0-IC), which may store blocks of instructions decoded into UOPs, in units of UC lines. UOP caches benefit from the temporal locality of control flows in a program, due to which previously executed instructions are executed again. Before fetching an instruction address from the L1-IC 210, it is first looked up in the L0-IC. If the corresponding UC line exists (meaning a hit) in the L0-IC, then the associated UOPs are directly supplied to the IDQ 280 for further execution, thereby completely avoiding the L1-IC→IFU→ILD→MITE decoding path. If the corresponding UC line does not exist (meaning a miss) in the L0-IC, then the instruction goes through entire complex decoding cycle through the L1-IC→IFU→ILD→MITE decoding path. The ability to avoid the L1-IC→IFU→ILD→MITE decoding path in this manner provide significant advantages, as the decoding process from instructions to UOPs (especially for high performance processors) can be costly in terms of circuitry, power consumption, and time, especially where a single complex instruction may perform several operations. It will be appreciated that, since the backend of a superscalar processor can execute several UOPs per clock cycle (e.g., 6 UOPs per cycle), the rate at which UOPs are supplied from the frontend of the processor to the backend of the processor is a key element of performance which may be achieved by high hit rate in the UC 270.

The IDQ 280 queues UOPs to be provided to the backend of the processor. The UOPs that are queued by the IDQ 280 may include UOPs decoded by the ID 260 (MITE) and UOPs delivered from the UC 270.

The frontend 200, as indicated above, is configured to support message processing by the processor based on dynamic control over processor instruction sets of the processor. It will be appreciated that the operation of frontend 200 in supporting message processing by the processor based on dynamic control over processor instruction sets of the processor may be further understood by first considering use of a frontend to support a packet forwarding plane, in an NFV router, implemented using one or more programs configured to provide a network processor for the packet forwarding plane (e.g., as presented with respect to FIGS. 3-6).

In an NFV router, typically, one or more processor cores of the processor are dedicated for the forwarding plane. The forwarding plane typically is implemented by a single program, which is denoted herein as NET_PROC (a mnemonic for Network Processor). For example, assuming that a processor has 16 cores and 10 of the 16 cores are assigned for the forwarding plane, then each of the 10 cores assigned to the forwarding plane would execute NET_PROC. This means the processor can process and forward 10 packets in parallel, while the 6 cores that are not assigned to the forwarding plane may be assigned for various control plane programs of the NFV router.

In general, NET_PROC is repeatedly executed by a processor core for every incoming packet. NET_PROC receives an incoming packet on a port, processes the packet, and sends it out on a port. NET_PROC invokes two independent functions, ING (a mnemonic for ingress) and EGR (a mnemonic for egress), to process incoming and outgoing packets, respectively. ING and EGR performs the majority of the work related to the forwarding of packets and consists of 90% of the instructions of the forwarding plane. The control plane programs states for packet flows in various Ingress Forwarding Tables (IFTs) and Egress Forwarding Tables (EFTs). ING looks up IFTs while processing an incoming packet and EGR looks up EFTs while processing an outgoing packet.

ING performs various ingress packet processing functions. For example, ING performs functions such as decapsulation of packets, classification of packets based on various headers of the packet, determining the next-hop forwarding contexts based on classifications, lookup forwarding tables associated with respective forwarding contexts and accordingly set up the input parameters for EGR, and so forth. It will be appreciated that ING may perform various other packet processing functions.

EGR performs various egress packet processing functions. For EGR performs functions such as identifying forwarding contexts on a packet based on input parameters from ING, looking up forwarding tables associated with respective forward contexts, modifying or adding appropriate encapsulations on respective forwarding contexts, sending packets to the appropriate outgoing ports, and so forth. It will be appreciated that EGR may perform various other packet processing functions.

In an NFV router, the forwarding plane (including NET_PROC, ING, and EGR) may be implemented in various ways in terms of configuration of the instruction set(s) for NET_PROC, ING, and EGR. Examples are presented in FIGS. 3-5, as discussed further below.

Figure 3:
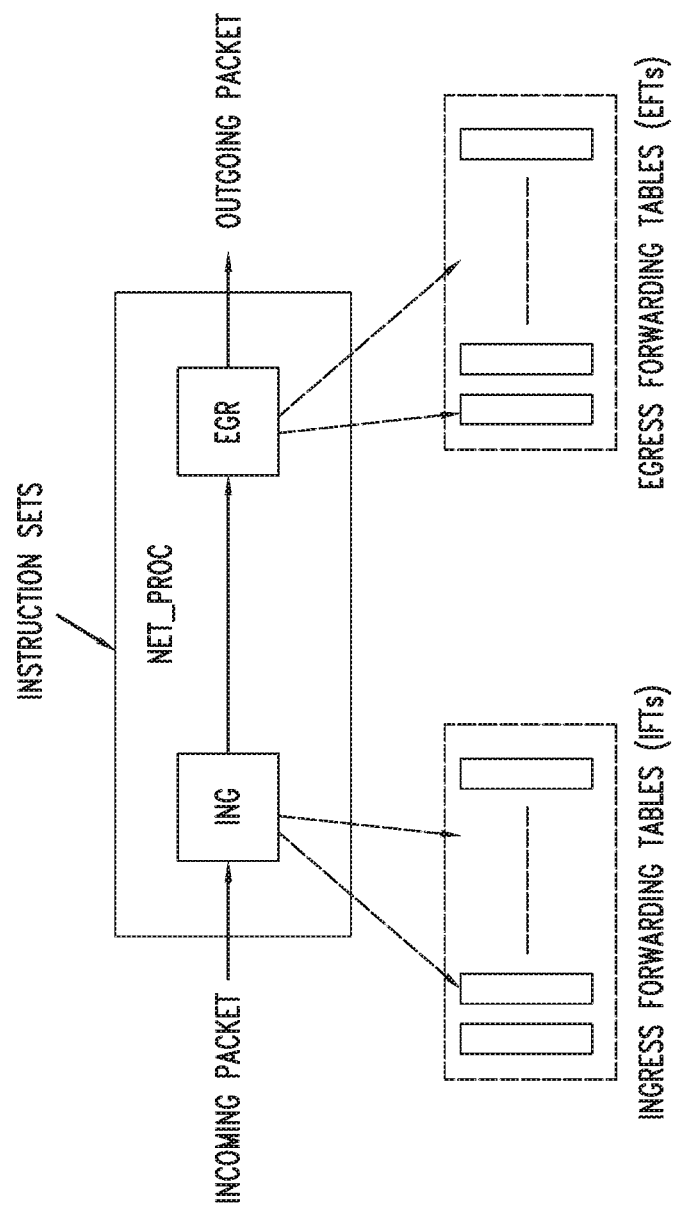
FIG. 3 depicts an example embodiment of a packet forwarding plane, in an NFV router, implemented using one or more programs configured to provide a network processor for the packet forwarding plane in which ingress and egress packet processing functions are provided by separate instruction sets.

FIG. 3 depicts an example embodiment of a packet forwarding plane, in an NFV router, implemented using one or more programs configured to provide a network processor for the packet forwarding plane in which ingress and egress packet processing functions are provided by separate instruction sets. In the packet forwarding plane 300 of FIG. 3, the ingress and egress packet processing functions are provided by separate instruction sets (e.g., ING and EGR are implemented as separate sub-routines of NET_PROC to processing incoming packets and outgoing packets, respectively). In this case, the forwarding plane includes three independent instruction sets—NET_PROC, ING, and EGR.

Figure 6:
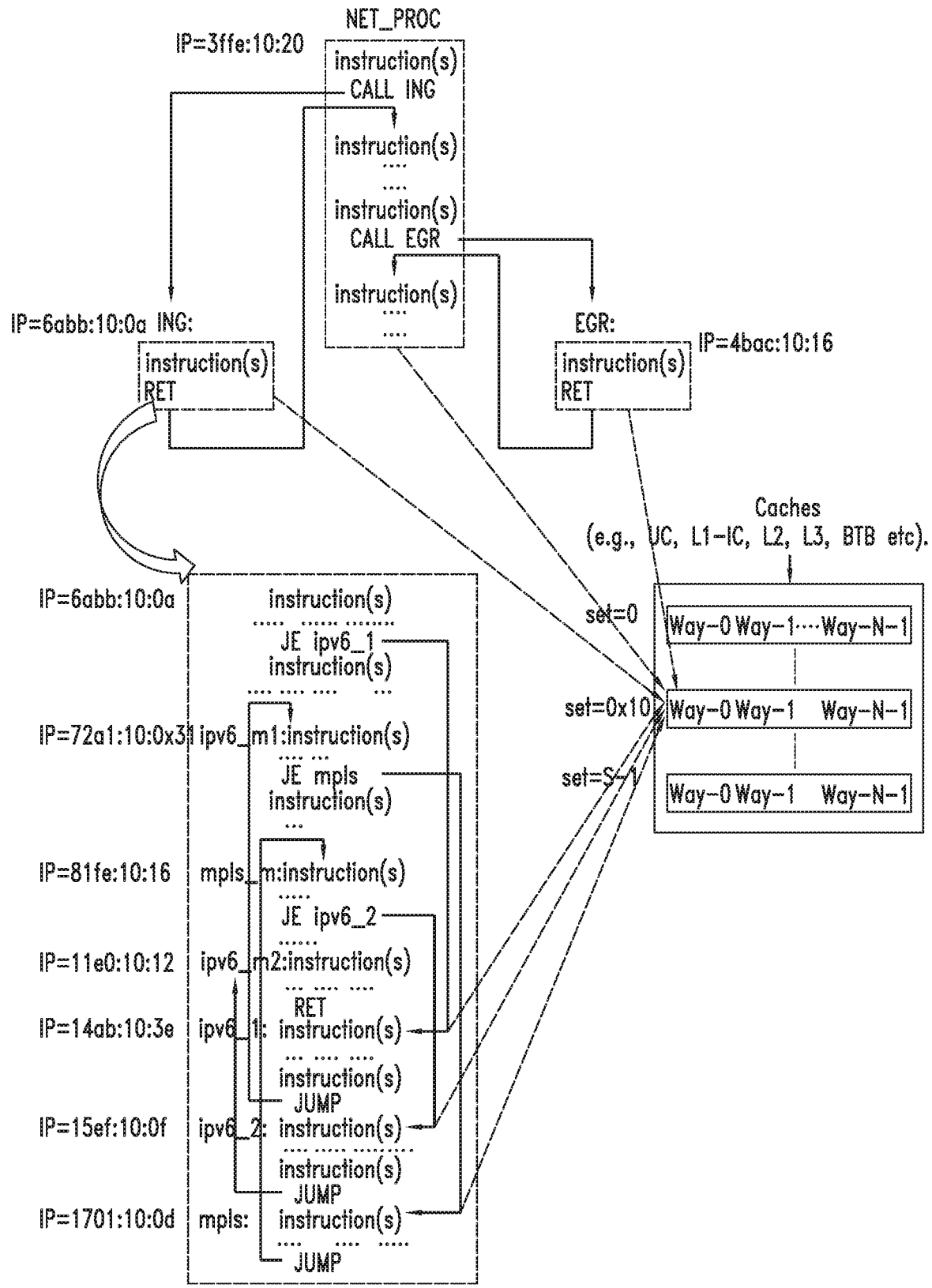
FIG. 6 depicts the flow control structure in a packet forwarding plane, in an NFV router implemented using one or more programs configured to provide a network processor for the packet forwarding plane, in which ingress and egress packet processing functions are provided by separate instruction sets.

The operation of a packet forwarding plane in an NFV router implemented using one or more programs configured to provide a network processor for the packet forwarding plane in which ingress and egress packet processing functions are provided by separate instruction sets may be further understood with respect to FIG. 6.

Figure 4:
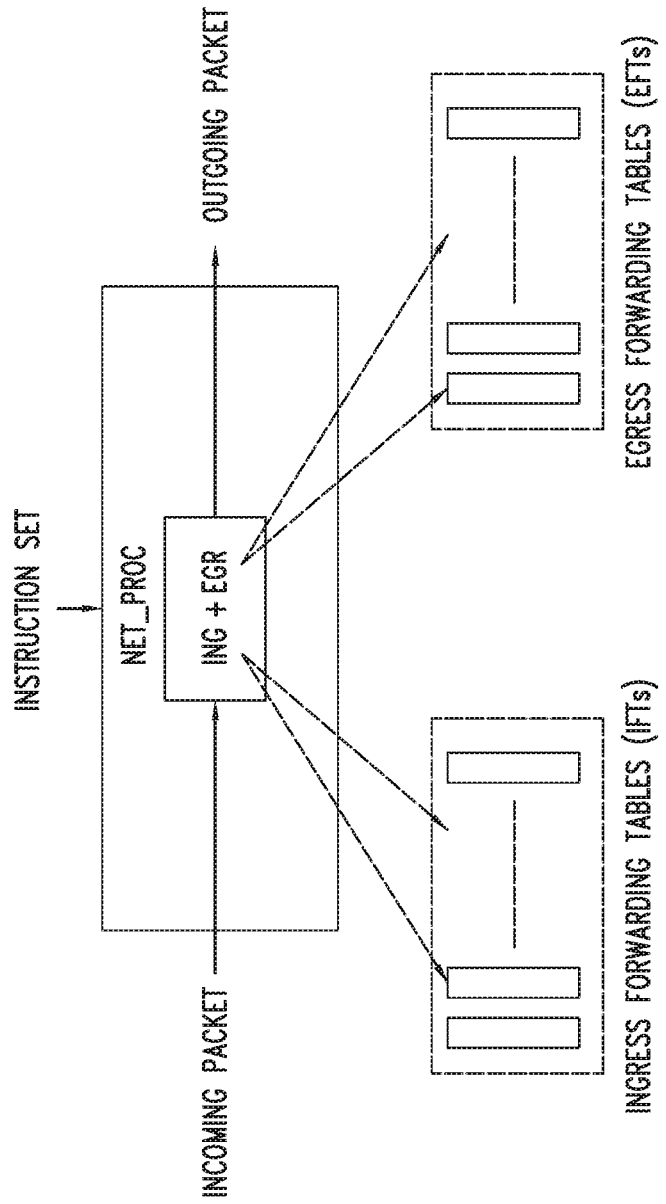
FIG. 4 depicts an example embodiment of a packet forwarding plane, in an NFV router, implemented using one or more programs configured to provide a network processor for the packet forwarding plane in which ingress and egress packet processing functions are provided by using a single instruction set.

FIG. 4 depicts an example embodiment of a packet forwarding plane, in an NFV router, implemented using one or more programs configured to provide a network processor for the packet forwarding plane in which ingress and egress packet processing functions are provided by using a single instruction set. In the packet forwarding plane 400 of FIG. 4, the ingress and egress packet processing functions are provided by a common instruction set (e.g., ING and EGR are implemented together as a sub-routine of NET_PROC to processing incoming packets and outgoing packets, respectively). In this case, the forwarding plane includes a single instruction set for ING and EGR.

Figure 5:
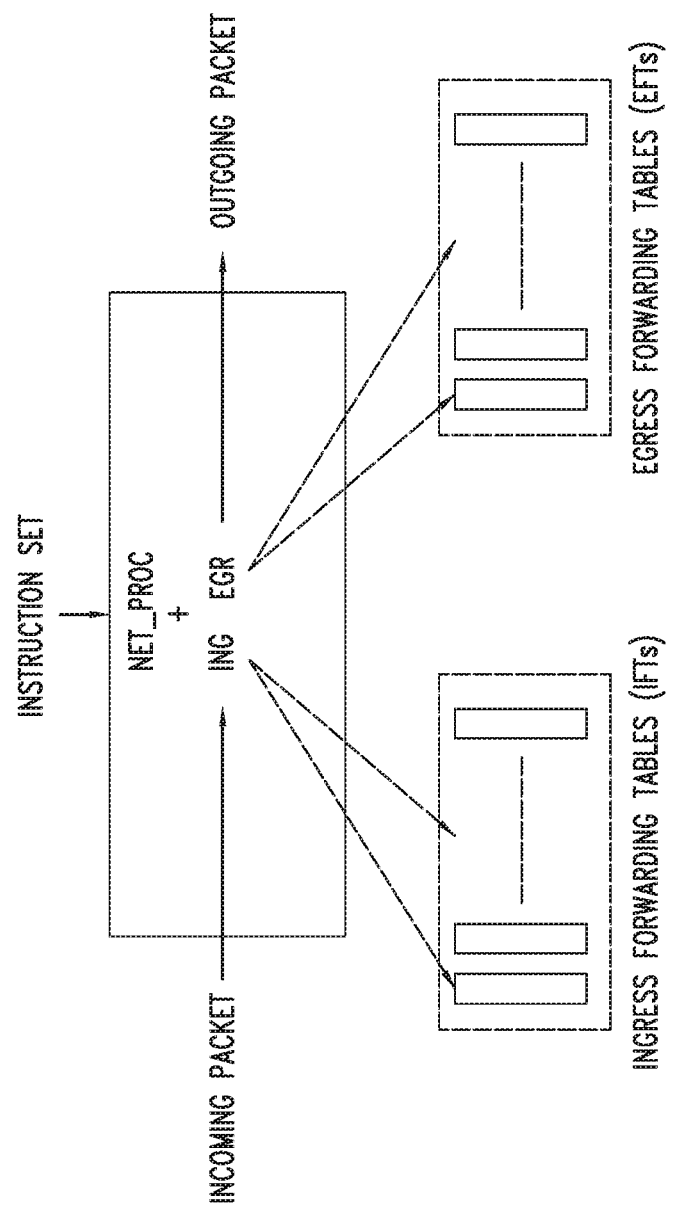
FIG. 5 depicts an example embodiment of a packet forwarding plane, in an NFV router, implemented using one or more programs configured to provide a network processor for the packet forwarding plane in which ingress and egress packet processing functions are provided by using a single instruction set that operates the entire forwarding plane.

FIG. 5 depicts an example embodiment of a packet forwarding plane, in an NFV router, implemented using one or more programs configured to provide a network processor for the packet forwarding plane in which ingress and egress packet processing functions are provided by using a single instruction set that operates the entire forwarding plane. In the packet forwarding plane 500 of FIG. 5, the ingress and egress packet processing functions are provided by a common instruction set (e.g., ING and EGR are implemented together in a common routine with NET_PROC to processing incoming packets and outgoing packets, respectively). In this case, the forwarding plane includes a single instruction set for NET_PROC, ING, and EGR.

It will be appreciated that, although primarily presented herein with respect to embodiments of message processing in which the instruction set architecture is configured such that the ingress and egress packet processing functions of the packet forwarding plane are provided using a separate instruction sets (e.g., as presented with respect to FIG. 3), embodiments of message processing may be configured for use in message processing in which the instruction set architecture is configured such that the ingress and egress packet processing functions of the packet forwarding plane are provided using a single instruction set (e.g., as presented with respect to FIG. 4 and FIG. 5).

FIG. 6 depicts the flow control structure in a packet forwarding plane, in an NFV router implemented using one or more programs configured to provide a network processor for the packet forwarding plane, in which ingress and egress packet processing functions are provided by separate instruction sets (e.g., an architecture as presented in FIG. 3).

NET_PROC is the starting point for processing a packet. The processor core executes the instructions in NET_PROC sequentially until the instruction CALL ING. The CALL instruction interrupts the flow by passing control to the sub-routine that is specified after the CALL, which is ING. Then, the instructions in ING are executed for processing the incoming packet. Upon completion of the instructions in ING, the processor core executes the RET instruction to return to the next instruction in NET_PROC after the CALL ING. Then, the processor core executes the instructions in NET_PROC sequentially until the instruction CALL EGR. The CALL instruction interrupts the flow of NET_PROC by passing control to the sub-routine that is specified after the CALL, which is EGR. Then, the instructions in EGR are executed for processing the outgoing packet. Upon completion of the instructions in EGR, the processor core executes RET instruction to return to the next instruction in NET_

PROC after the CALL EGR. This process is repeated by the processor core for each incoming packet.

Within NET_PROC, ING, and EGR, the sequential execution of instructions is further interrupted by branch instructions. For example, within ING, the processor core executes the instructions sequentially until it hits the JE ipv6_1 instruction. If the packet is an IPv6 packet, then this JE instruction switches the execution sequence to the control block labeled as ipv6_1. After executing the sequence in the ipv6_1 control block, it uses a JUMP instruction to merge back to the primary instruction sequence at instruction labeled as ipv6_m_1. The sequence executes until it hits the JE MPLS instruction. If the packet is an MPLS packet, then this JE instruction switches the execution to the control block labeled as mpls. After executing the sequence in the mpls control block, it uses a JUMP instruction to merge back to the primary instruction sequence at instruction labeled as mpls_m. The sequence executes until the JE ipv6_2 instruction. If the packet is an IPv6 packet, then this JE instruction switches the execution sequence to the control block labeled as ipv6_2. After executing the sequence in the ipv6_2 control block, it uses a JUMP instruction to merge back to the primary instruction sequence at instruction labeled as ipv6 m_2. It is noted that FIG. 6 describes only two top level conditional branches for an IPv6 packet in ING, but, typically, there could be multiples of such branches for the same condition (e.g., IPv6, MPLS, or the like). Further, a top-level conditional branch can have nested branches. It will be appreciated that, while similar control flows exist within EGR as well, these control flows have been omitted from FIG. 6 for purposes of clarity.

In general, the forwarding plane of a high-performance NFV router is expected to consistently process and forward packets with minimum latency and with the least power consumption in order to meet optimal per-bit operational cost. In other words, the forwarding plane is required to extract the peak performance of a processor core.

One factor that drives the performance and power efficiency of the forwarding plane is the execution rate of instructions per clock cycle, i.e., the instruction throughput. Since ING and EGR include most of the instructions (~95%) of the forwarding plane, references herein to the "instruction sets of forwarding plane" (unless indicated otherwise) are meant to refer to the instruction set of ING and the instruction set of EGR. The execution rate at the backend is largely dependent on rate of supply of UOPs from the frontend, which is dependent upon hit rates of instructions in various caches in the front-end (e.g., the L1-IC, L2 caches, L3 caches, the UC, the BTB, and so forth).

If UOPs of decoded instructions are missed in the UC, then the missed instructions need to be fetched from L1-IC and then decoded along the costlier IFU→ILD→IQ→MITE path. A UC miss results in a decrease in the supply rate of UOPs to the backend and increases power consumption. If the instructions are a miss in L1-IC, then the missed instructions need to be fetched from L2 cache, which adds further delay. Similarly, if the instructions are missed in L2 cache then the missing ones need to be fetched from L3 cache, which adds even further delay. Misses in L3 cache will require the processor to read the instructions from memory, which adds even further delay.

If control instructions are missed in BTB, then it may result in branch misprediction. Branch misprediction happens when execution of a control instruction at the backend takes the alternate direction than the direction taken speculatively by the frontend at the time of fetching the control instruction. This means all subsequent instructions following that control instruction in the incorrect direction that are currently in the pipeline need to be discarded and the processor needs to restart fetching the instructions from the correct direction of the branch. Thus, branch misprediction causes a stall in the processor and wastes clock cycles and power and, thus, is a significant performance impediment in pipelined processors. The number of stages in a pipeline is increasing with advancement of processor technology and the branch misprediction penalty increases with the length of the pipeline.

The hit rate in various processor caches (e.g., L1-IC, L2, L3, UC, BTB, and so forth) are influenced by compulsory misses, capacity misses, and conflict misses, each of which is discussed further below.

Compulsory misses are the misses on the first access to a cache line, and also are referred to as cold start misses or first reference misses. The cache line must be brought into the cache. Compulsory misses are not avoidable and, as this is a one-time miss, it does not impact continual performance of the program.

Conflict misses occur when the number of cache lines P competing for a set are more than the number of ways N in the set. So, to accommodate a new cache line, one or more existing cache lines needs to be evicted from the set. Herein, the term thrashing is used to denote eviction of cache lines due to conflicts in a set.

Capacity misses occur when cache lines are being evicted from cache because the cache cannot contain all cache lines needed for the program if the size of the program is much larger than the overall capacity of the cache. To eliminate capacity misses in a set associative cache, the size of the program must be less than or equal to the size of the cache. In this case, there is not conflict miss either. Thus, it is generally desirable that the size of instruction sets in the forwarding plane remain as small as possible.

It is noted that the control flows as depicted in FIG. 6 can lead to severe conflict misses in various caches. Namely, if the total size of the instruction sets in the forwarding plane is larger than the capacity of a cache then, before hitting a capacity miss, it is more likely that it will hit conflict miss due to its control flows (e.g., control flows of FIG. 6), because control flows increase the probability of P number of control blocks sharing the same IP-index when the number of cache lines in a set N is less than P. This pattern of control flows as depicted in FIG. 6 can lead to severe conflict misses in various caches. This may be further understood by way of an example of conflict misses in UC. To process an incoming packet, the instructions in NET_PROC starts at IP=3ffe:10:20 (read in format IP-tag: IP-index: IP-offset). The instructions in NET_PROC are fetched, decoded, stored in UC, and executed in sequence until CALL ING. The subset of instructions in NET_PROC so far that share the same IP-index 0x10 are stored in the set 0x10 in UC. CALL ING switches the instruction sequence to ING starting at IP=6abb:10:0a, which bears the same IP-index 0x10. The instructions in ING are fetched, decoded, and stored in the same UC sets which also stored the instructions from NET_PROC. It is possible that, in order to store the instructions of ING, some or all UC lines occupied by instructions from NET_PROC needs to be evicted due to non-availability of free UC lines in a set. For this example, assume that the packet type is IPv6. Then within ING, the JE ipv6_1 instruction switches the instruction sequence to control block ipv6_1 that starts at IP=14ab:10:3e. The switch is done by the instruction, because the condition is set based on the IPv6 packet type (e.g., using a register in the core or the like) which is checked by the instruction JE to decide whether to branch or not. The instructions in control block ipv6_1 are fetched, decoded, and stored in the same UC sets which are occupied by instructions in ING so far. It is possible that, in order to store the instructions in the ipv6_1 control block, some or all UC lines in those sets need to be evicted. After executing the sequence in the ipv6_1 control block, the JUMP instruction merges back the execution at the instruction labeled as ipv6_m_1, which is at IP=72a1:10:0x31. So, subsequent instructions are stored in the same UC sets which also stored the instructions in the ipv6_1 control block. It is possible that, in order to store the instructions of ipv6 ml, some or all UC lines occupied by instructions from ipv6_1 in the common sets needs to be evicted. Similar thrashing behavior may be observed when the control flow jumps back and forth for this IPv6 packet between control blocks ipv6_2 and ipv6_m2. Subsequently, when EGR is called by NET_PROC, the same pattern of thrashing may occur in UC.

So, while processing every incoming packet, majority of the instructions in the various routines, sub-routines, and control blocks (e.g., NET_PROC, ING, EGR, ipv6_1, ipv6_m1, ipv6_2, ipv6_m2, mpls, mpls_m, and so forth) need to be fetched again from L1-IC, decoded, and stored into UC. The location of the control blocks in the program memory are independent of the underlying micro-architecture of the processor, especially since the microarchitecture implementation of the caches is not visible to the program. For example, the number of bits in the IP-tag, IP-index, and IP-offset fields for UC may vary between micro-architectures, which changes the run-time foot print of NET_PROC, ING, and EGR in UC between respective micro-architectures. On the other hand, modifications in the program code can relocate addresses of control blocks, which changes the run-time foot print of NET_PROC, ING, and EGR in a specific UC. Similarly, the control instructions associated with the control blocks (e.g., CALL ING, CALL EGR, JE ipv6_1, JE ipv6_2, JE mpls, and so forth), RET instructions, and JUMP instructions may thrash with each other in BTB, which may result in branch misprediction.

Various example embodiments for supporting packet processing by a forwarding plane may be configured to improve cache efficiency of instructions in order to support various desirable aspects of the forwarding plane (e.g., reducing instruction set size, reducing the number of control blocks/instructions, and so forth).

Various example embodiments for supporting packet processing by a forwarding plane may be configured to improve cache efficiency of instructions by reducing instruction set size. In general, the size of the instruction sets should be kept as small as possible, such that the instruction sets fit into various caches. Moreover, keeping the instruction sets smaller also reduces the probability of conflict misses. As indicated in FIG. 6, the probability of conflict misses increases with the probability of placement of control blocks in arbitrary addresses. Smaller instruction sets provides lesser displacement of control blocks.

Various example embodiments for supporting packet processing by a forwarding plane may be configured to improve cache efficiency of instructions by reducing the number of control blocks/instructions. In general, the number of control instructions/block should be kept at the minimum. With lesser control blocks, the probability of conflict misses in the caches decreases. Each control instruction consumes an entry in BTB, which may get thrashed due to conflict misses in BTB and, thus, leading to branch misprediction and stalls in the processor. One effective technique for reducing processor stalls due to mispredicted branches is to eliminate the control instructions altogether. Removing the control instructions not only improves runtime performance of the instruction set, it also helps the compiler (the forwarding plane code generator from a higher-level language/construct) to optimize the instruction set. Since removal of all control instructions is not possible, reduction of control instructions may lead to optimal utilization of BTB and other caches and runtime efficiency of the instruction set. Unconditional branch control instructions (e.g., CALL, RET, and JUMP) are always predicted correctly, whereas condition branch control instructions (e.g., ones that rely on data values, such as JE) may be difficult to predict. Generally, improvements may be realized by targeting such data-dependent condition branch control instructions for reduction.

It will be appreciated that the number of control instructions in the forwarding plane grows with the number of features in ING and EGR, which also results in larger instruction sets due to their associated control blocks. Almost every feature is associated with data dependent control instructions. In the example in FIG. 6, JE ipv6_1 and JE ipv6_2 are two such control instructions associated with IPv6 as the feature in ING. For simplicity, FIG. 6 illustrated two exemplary control instructions for IPv6; however, in reality, a feature may be associated with a large number of control instructions and control blocks. As stated earlier, data dependent control instructions are more prone to branch misprediction and a larger instruction set is more prone to misses in various caches. There are many deployment scenarios in which only a small subset of the overall features supported in the forwarding plane are exercised, i.e., required by the packets currently being forwarded. Thus, since an instruction set typically includes control instructions/blocks for all packet processing features, including those packet processing features that are used as well as those packet processing features that are not used, the overall forwarding performance of the exercised packet processing features often remains sub-optimal.

Various example embodiments for supporting packet processing by a forwarding plane may be configured to improve cache efficiency of instructions by dynamically adjusting the instruction sets in the forwarding plane (e.g., the ING instruction set and the EGR instruction set) to include only those features that are to be used to process packets. For example, referring to the example in FIG. 6, if the forwarding plane is receiving IPv4 packets only, then the control blocks for handling of IPv6 packets (namely, the ipv6_1 and ipv6_2 control blocks) and MPLS packets (namely, the mpls control block) can be dynamically eliminated from the instruction set of ING. As a result, the instruction set of ING becomes smaller in size and the control blocks ipv6_1, ipv6_2, and mpls are no longer present to interfere in various caches. The control instructions JE ipv6_1, JE ipv6_2, JE mpls, JUMP, and so forth that are associated with the eliminated control blocks no longer exist in the instruction set of ING and, thus, do not consume any entry in BTB. Later, if the forwarding plane starts receiving IPv6 packets, then the instruction set can be dynamically modified to include the control blocks for handling of IPv6 packets (namely, the ipv6_1 and ipv6_2 control blocks) and the associated control instructions for handling of IPv6 packets. Similarly, if the forwarding plane later starts receiving MPLS packets, then the instruction set can be dynamically modified to include the control blocks for handling of MPLS packets (namely, the mpls control block) and the associated control instructions for handling of MPLS packets. It will be appreciated that, although primarily described with respect to dynamically adjusting the instruction set in ING, similar capabilities may be provided for dynamically adjusting the instruction set in EGR.

Various example embodiments are configured to support a dynamic instruction set in the forwarding plane of a network processor. The instruction set is dynamic because it adapts based on the features demanded by packets passing through the forwarding plane. At any given point in time, features that are not required by packets are not included in the instruction set. With this approach, the size of the instruction set and its number of control blocks and control instructions can be held at the minimum. This greatly improves cache efficiency and power consumption by the forwarding plane in the frontend of the processor, which results in optimal packet forwarding rate for the features exercised by the packets.

Various example embodiments are configured to support a dynamic instruction set in the forwarding plane of a network processor based on use of levels of feature sets. For example, the levels of feature sets for the forwarding plane may be arranged as follows: level 0=feature set A, level 1=feature set (A+B), level 2=feature set (A+B+C), ..., level N=feature set (A+B+C+ ... N). Herein, level X of an instruction set is denoted as LX (e.g., level 0 may be denoted as L0, level 1 may be denoted as L1, and so forth). The forwarding plane stores multiple versions of an instruction set in memory, wherein each version of an instruction set corresponds to a specific level of that instruction set. L0 is the lowest level that includes the instructions for processing only the list of features {A1, A2, ... Ak} denoted as feature set A, which is the minimal set of features supported by the forwarding plane. Subsequent levels include instructions for processing a superset of features that includes the features from all lower levels. The level specific feature sets may be organized based on dependency, such as feature set B also depends on some parts of feature set A, feature set C depends on some parts of feature sets A and B, and so forth. For example, feature set A can be features for layer 2 switching only (e.g., Ethernet), feature set B can be features for IPv4 routing, feature set C can be features for IPv6 routing since feature set C shares some common functionalities with feature set B, feature set D can be MPLS since MPLS shares some functionalities with IPv4 and IPv6, feature set E can be IPv4-VPN since it uses IP and MPLS infrastructure, feature set F can be IPv6-VPN since it both uses IP and MPLS, and also shares some common infrastructure with IPv4-VPN, and so forth. Thus, the size of the instruction sets grow with the levels. The feature sets also may be organized based on priority, such as using the priority order A>B>C> ... >N. The versions of the instruction set may be controlled so that only one version of the instruction set is active (i.e., is used for forwarding packets) at any given point in time. The use of multiple versions of an instruction set corresponding to respective groups of feature sets may be further understood by way of reference to FIGS. 7 and 8.

Figure 7:
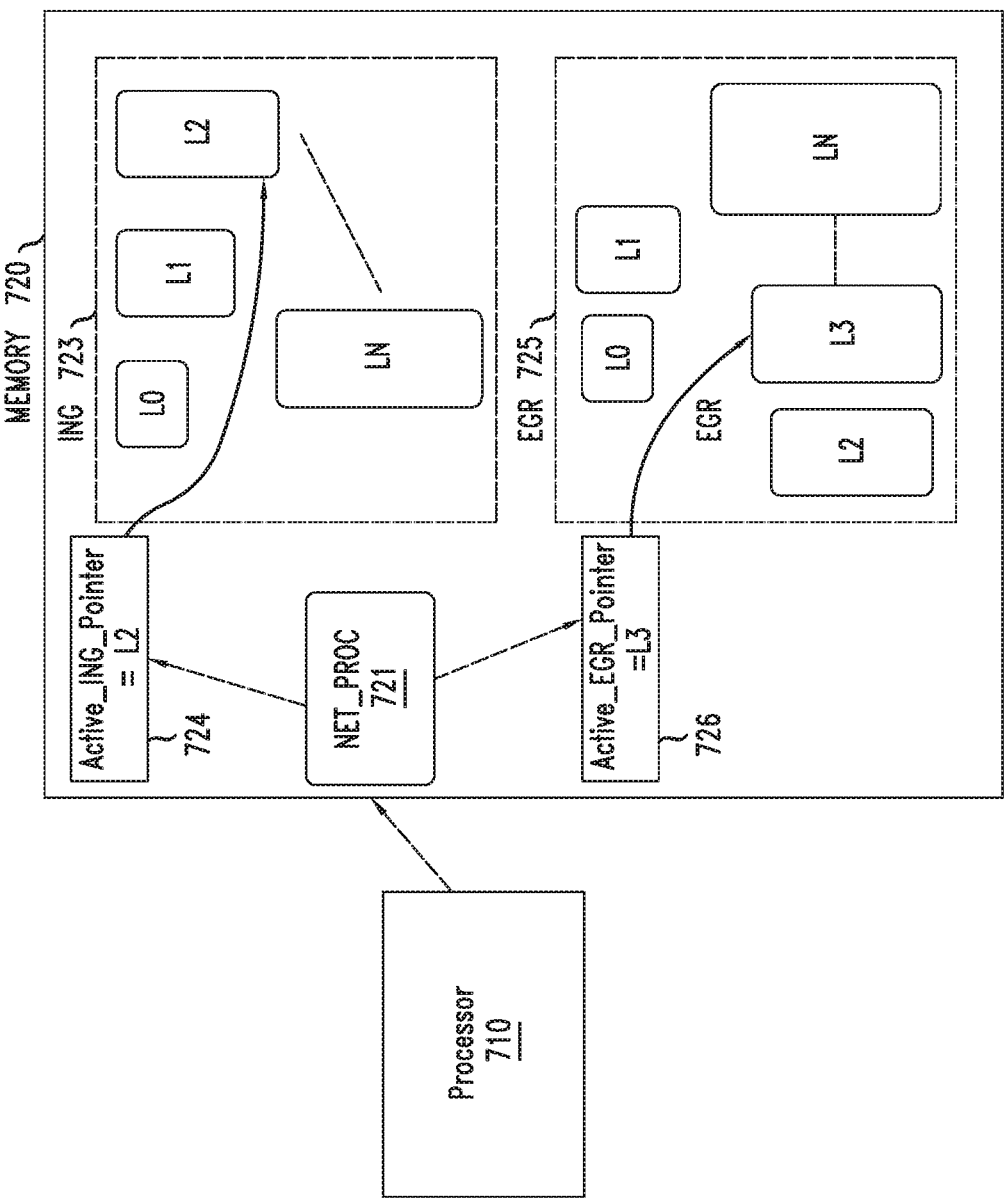
FIG. 7 depicts an example embodiment of a device configured to support message processing by a processor based on dynamic control of instruction sets used by the processor for message processing.

FIG. 7 depicts an example embodiment of a device configured to support message processing by a processor based on dynamic control of instruction sets used by the processor for message processing. It will be appreciated that the instruction sets of FIG. 7 correspond to the arrangement of FIG. 3 in which the ingress and egress packet processing functions are provided by separate instruction sets.

The device 700 includes a processor 710 and a memory 720. The memory 720 stores a NET_PROC program 721 which includes an ING sub-routine for ingress processing of packets and an EGR sub-routine for egress processing of packets. The memory 720, for the ING sub-routine, stores a plurality of ING instruction sets 723 (illustratively, instruction sets for N levels of feature sets denoted as L0, L1, ..., LN) and IFTs (which are omitted for purposes of clarity). Similarly, the memory 720, for the EGR sub-routine, stores a plurality of EGR instruction sets 725 (illustratively, instruction sets for N levels of feature sets denoted as L0, L1, ..., LN) and EFTs (which are omitted for purposes of clarity).

The processor 710 processes incoming packets based on NET_PROC 721 and the ING sub-routine using a currently active one of the ING instruction sets 723 (illustratively, the instruction set for level L2). The memory 720 stores a pointer to the currently active one of the ING instruction sets 723, denoted as Active_ING_Pointer 724, that points to the memory address of the first instruction (i.e., base pointer) of the currently active instruction set of the ING sub-routine (again, L2). As discussed herein, although omitted from FIG. 7, the currently active one of the ING instruction sets 723 may be changed dynamically as needed (e.g., on a packet-by-packet basis) such that different sets of packet processing features may be applied dynamically for packet processing depending on the sets of features needed to process the respective packets. The currently active one of the ING instruction sets 723 for ING may be changed by changing the Active_ING_Pointer 724. Herein, the instruction set of ING for level LX is denoted as LX@ING. The processor 710 executes NET_PROC 721, which in turn invokes the currently active version of the ING function (namely, the current instruction set of the current level configured to provide a particular set of ING packet processing functions) pointed to by Active_ING_Pointer 724.

The processor 710 processes outgoing packets based on NET_PROC 721 and the EGR sub-routine using a currently active one of the EGR instruction sets 725 (illustratively, the instruction set for level L3). The memory 720 stores a pointer to the currently active one of the ING instruction sets 725, denoted as Active_EGR_Pointer 726, that points to the memory address of the first instruction (i.e., base pointer) of the currently active instruction set of the ING sub-routine (again, L3). As discussed herein, although omitted from FIG. 7, the currently active one of the EGR instruction sets 725 may be changed dynamically as needed (e.g., on a packet-by-packet basis) such that different sets of packet processing features may be applied dynamically for packet processing depending on the sets of features needed to process the respective packets. The currently active one of the EGR instruction sets 725 for ING may be changed by changing the Active_EGR_Pointer 726. Herein, the instruction set of EGR for level LX is denoted as LX@EGR. The processor 710 executes NET_PROC 721, which in turn invokes the currently active version of the EGR function (namely, the current instruction set of the current level configured to provide a particular set of EGR packet processing functions) pointed to by Active_EGR_Pointer 726.

It will be appreciated that, although omitted for purposes of clarity, a device similar to device 700 of FIG. 7 (which illustrates an implementation for the arrangement of FIG. 3 in which the ingress and egress packet processing functions are provided by separate instruction sets) may be configured to support the arrangement of FIGS. 4 and 5 in which the ingress and egress packet processing functions are provided by using a single instruction set. In at least some example embodiments, a single set of levels (and, thus, a single group of instruction sets corresponding to the respective levels) may be supported for the combination of the ingress and egress packet processing functions (i.e., each level includes a superset of features for both ING and EGR). In such embodiments, a single pointer (e.g., Active_Pointer) may be used to point to the currently active one of the ING+EGR instruction sets (e.g., the pointer may point to the memory address of the first instruction (i.e., base pointer) of the currently active instruction set of the ING+EGR combined packet processing routine).

It will be appreciated that, for purposes of clarity, various embodiments for supporting message processing by a processor based on dynamic control of instruction sets used by the processor for message processing are primarily presented herein within the context of a forwarding plane that is implemented with independent ING and EGR functions (namely, as presented with respect to the arrangement of FIG. 3 and the associated device of FIG. 7) which are configured to manage respective sets of levels (and, thus, instruction sets and packet processing features that are applied to packets) independently based on the feature requirements of incoming and outgoing packets, respectively.

Various example embodiments are configured to support a dynamic instruction set in the forwarding plane of a network processor based on use of levels of feature sets and dynamic control over application of levels of feature sets (e.g., upgrading to higher levels and downgrading to lower levels, on demand, based on the requirements of the packets being processed).

In at least some example embodiments, upgrading of the currently active instruction set to a higher level is triggered dynamically by a packet while it is being processed by the currently active instruction set. When a packet is processed by the active instruction set, the packet is mapped to the level (and, thus, feature set) that is needed to process the packet. The mapping of a packet to its feature set (level) is done based on parameters on various headers in the packet and/or forwarding table lookups. At any point during processing, if the feature set required by the packet is not supported by currently active instruction set, then the forwarding plane switches to the higher level instruction set that includes the packet processing features required for processing the packet. The Active_ING_Pointer or Active_EGR_Pointer is updated to point to the higher level instruction set. From that point onwards, the current packet and subsequent packets are processed by the higher level instruction set. It will be appreciated that the upgrade of the current level to the higher level is to be performed before the packet is modified by the current level since the packet is processed from the beginning by the higher level as if it is a fresh packet from that level. This process may be further understood by way of reference to the following examples.

For example, the ING and EGR functions may be booted with their respective L0 instruction sets, which support only the basic feature set A. In this example, assume that L0@EGR encounters a packet for feature B which is not supported at L0, then L0@EGR performs following actions: (1) determines that the level to be used for feature B is L1, (2) upgrades the instruction set from L0@EGR to L1@EGR (e.g., by updating the Active_EGR_Pointer to point to L1@EGR), and (3) reinserts the packet to the L1@EGR instruction set for processing (i.e., the packet is processed from the beginning by L1@EGR as if it is a new packet). At this point, L1 is the currently active level and the EGR will continue processing subsequent packets using L1@EGR until a new packet requiring a level upgrade or downgrade is encountered by the EGR.

For example, as in the example above, the ING and EGR functions may be booted with their respective L0 instruction sets, which support only the basic feature set A. In this example, assume that L0@EGR encounters a packet for feature C which is not supported at L0, then L0@EGR performs following actions: (1) determines that the level to be used for feature C is L2, (2) upgrades the instruction set from L0@EGR to L2@EGR (e.g., by updating the Active_EGR_Pointer to point to L2@EGR), and (3) reinserts the packet to the L2@EGR instruction set for processing (i.e., the packet is processed from the beginning by L2@EGR as if it is a new packet). At this point, L2 is the currently active level and the EGR will continue processing subsequent packets using L2@EGR until a new packet requiring a level upgrade or downgrade is encountered by the EGR. Essentially, once a feature C packet upgraded the instruction set to level 3, subsequent feature A packets and feature B packets will continue to be processed by level 3 until a level upgrade or downgrade. This example illustrates that levels may be skipped during upgrades and downgrades to ensure that the optimum-sized feature set is used for packet processing.

For example, as in the example above, the ING and EGR functions may be booted with their respective L0 instruction sets, which support only the basic feature set A. In this example, assume that L0@EGR encounters a packet for feature B which is not supported at L0, then L0@EGR performs following actions: (1) determines that the level to be used for feature B is L1, (2) upgrades the instruction set from L0@EGR to L1@EGR (e.g., by updating the Active_EGR_Pointer to point to L1@EGR), and (3) reinserts the packet to the L1@EGR instruction set for processing (i.e., the packet is processed from the beginning by L1@EGR as if it is a new packet). In this example, further assume that, during processing of the packet by L1@EGR, it is determined that the packet also needs feature C. Then, the instruction set is further upgraded to L2@EGR and the packet is processed from the beginning by the L2@EGR as if it is a new packet. At this point, L2 is the currently active level and the EGR will continue processing subsequent packets using L2@EGR until a new packet requiring a level upgrade or downgrade is encountered by the EGR. This example illustrates that a single packet can trigger multiple upgrades or downgrades of the active instruction set across multiple levels.

In at least some example embodiments, downgrading of the currently active instruction set to a lower level is triggered dynamically by a packet while it is being processed by the currently active instruction set. When a packet is processed by the active instruction set, it exercises various features on the packet based on the packet headers and/or the states in the forwarding tables. At any point during processing, if the currently active instruction set supports additional features not required by the packet, then the forwarding plane swaps in the lower level instruction set that includes the packet processing features required for processing the packet. The Active_ING_Pointer or Active_EGR_Pointer is updated to point to the lower level instruction set. From that point onwards, the current packet and subsequent packets are processed by the lower level instruction set.

As may be seen from the examples above, the upgrading and downgrading of instruction sets is packet driven. For example, assuming that a router is configured with feature sets A through F and the forwarding plane has been seeing packets only for features A-C, the forwarding plane will be constrained to run at level C, instead of F, thereby reducing the number of control blocks/instructions of the forwarding plane and, thus, improving various aspects of operation of the control plane. This ensures that, unless a higher level feature set configured in the router is actually exercised by packets, the instruction set in the forwarding plane will not include that higher level feature set and, thus, the instruction set of the forwarding plane will be contained at a size that is no bigger than what is actually needed for processing of the packets. In other words, the forwarding plane will run at the bare minimum instruction set (level) as demanded by the packets, which provides various advantages since, as discussed above, the size of the instruction set is a key driving factor of the performance of the forwarding plane. For example, operation of the forwarding plane of the router in this manner will provide an improved or even optimal packet forwarding rate for packets. Additionally, this approach confines the decision of switching levels within the forwarding plane alone, without having any dependency on the control plane or other modules/components in the router.

In this manner, various example embodiments are configured to support a dynamic instruction set in the forwarding plane of a network processor based on use of levels of feature sets and dynamic control over application of levels of feature sets (e.g., upgrading to higher levels and downgrading to lower levels, on demand, based on the requirements of the packets being processed).

Various example embodiments are configured to support mapping of packets to feature sets.

In order to support dynamic level switching, ING and EGR are configured to map packets to level specific feature set(s) before the packets are modified by the current level since, in the case of a level upgrade for a packet, the packet is processed from the beginning by the higher level. The mapping of a packet to a level specific feature set before the packet is modified by the current level may be performed by ING and EGR in various ways as discussed further below.

Various example embodiments are configured to support mapping of packets to feature sets at the ingress by the ING function.

The ING function parses the headers of a packet and, based on the parsing of the headers of the packet, determines various contexts of the packet. Based on the contexts, ING looks up the appropriate IFTs. It is noted that high-level logic in ING for processing a packet in Ethernet, IPv4, IPv6, MPLS, IPv4-VPN, and IPv6-VPN layers is depicted in FIGS. 8A-8E.

FIGS. 8A-8E depict an example embodiment of high-level logic for processing a packet on an ingress side of a router based on dynamic control of instruction sets.

As depicted in FIGS. 8A-8E, the high-level logic translates into ISA instructions with various control flows, similar to the example of FIG. 6. Each "if/else" control statement results into branch instructions such as JE in x86, "goto" control statement results into JUMP in x86, and so forth. In FIGS. 8A-8E, only a few key control statements that are relevant to the subject are illustrated and others are omitted for purposes of clarity.

As depicted in FIGS. 8A-8E, an incoming packet is mapped into level associated feature sets. Here, the following convention of levels is being used: Ethernet, POS (Packet-over-Sonet)=feature set A=L0, IPv4 Routing=feature set B=L1, IPv6 Routing=feature set C=L2, MPLS=feature set D=L3, IPv4-VPN=feature set E=L4, IPv6-VPN=feature set F=L5, and so forth. The operation of the high-level logic of FIGS. 8A-8E for processing a packet on an ingress side of a router, based on dynamic control of instruction sets, may be further understood with respect to the following examples.

As depicted in FIGS. 8A-8E, packet P1, by default, is mapped to feature set A since it is the minimum feature set required to process any packet.

As depicted in FIGS. 8A-8E, the incoming port type in condition 801 determines if P1 needs to be processed as Ethernet or as POS. If condition 801 is true, condition 802 is checked to determine if the address is local.

If condition 802 is true (namely, P1 arrived on an Ethernet port and processing of P1 at the Ethernet layer determined that P1 needs to be switched at the Ethernet layer itself), then, as per the logic in FIGS. 8A-8E, it reaches step 803 and jumps to send_packet_to_egress, which finally enqueues P1 to egress with the meta header (to_Egress_Hdr). In this case, P1 is mapped to feature set A only.

If condition 802 is false (namely, that P1 arrived on an Ethernet port and processing of P1 in the Ethernet layer determined that P1 terminates at the Ethernet layer), then, as per the logic in FIGS. 8A-8E, the layer 3 payload needs to be processed. The logic determines the layer 3 protocol type (l3_protocol) from the Ethernet header in the packet and jumps to process_layer_3 at instruction 804. If the l3_protocol is IPv4 in condition 805, then the packet is mapped to feature set B; otherwise, if the l3_protocol is IPv6 in condition 806, then the packet is mapped to feature set C. Additionally, if the l3_protocol is MPLS in condition 807 then the packet is mapped to feature set D. Additionally, while processing the MPLS layer, if forwarding state of a label indicates it as IPv4-VPN label (i.e., condition 808 is true), then P1 is mapped to feature set E.

At the completion of processing of P1 by ING, if P1 needs to be forwarded by egress then each of the feature sets finally jumps to send_packet_to_egress, which strips down the required incoming headers (Strip_Hdrs) and prepends the meta header (to_Egress_Hdr) on P1 that contains the processing information for egress. It is noted that P1 is not modified until the stage send_packet_to_egress, which satisfies the clause that mapping of P1 to level-based feature sets takes place before P1 is modified.

As may be seen from FIGS. 8A-8E, certain classification at ING may be possible based on the packet headers alone, such as determination of B, C, D based on l3_protocol_type which is derived from Ethernet or POS header in the packet. Certain classification is made based on the combination of packet headers and table lookups, such as the case of IPv4-VPN, IPv6-VPN, and so forth. For example, IPv4-VPN is decided based on a label in the packet and the state of the label in ILM Table, the combination of which maps P1 to feature set E. Certain classification is made based on the table lookups alone, such as where the incoming port type is determined based on port specific states, which determines mapping of P1 to feature set A as opposed to a different feature set.

Various example embodiments are configured to provide various other functions for supporting mapping of packets to feature sets at the ingress by the ING function.

Various example embodiments are configured to support mapping of packets to feature sets at the egress by the EGR function.

The EGR function receives a packet from ING with to_Egress_Hdr prepended onto the packet, where to_Egress_Hdr includes packet classifications/types and various directives for forwarding the packet. It is noted that high-level logic in EGR for processing and forwarding a packet in Ethernet, IPv4, IPv6, MPLS, IPv4-VPN, and IPv6-VPN layers is depicted in FIGS. 9A-9D.

FIGS. 9A-9D depict an example embodiment of high-level logic for processing a packet on an egress side of a router based on dynamic control of instruction sets.

As depicted in FIGS. 9A-9D, the high-level logic translates into ISA instructions with various control flows, similar to the example of FIG. 6. Each "if/else" control statement results into branch instructions such as JE in x86, "goto" control statement results into JUMP in x86, and so forth. In FIGS. 9A-9D, only a few key control statements that are relevant to the subject are illustrated and others are omitted for purposes of clarity.

As depicted in FIGS. 9A-9D, a packet to be forwarded is mapped into level associated feature sets. Here, the following convention of levels is being used: Ethernet=feature set A=L0, IPv4 Routing=feature set B=L1, IPv6 Routing=feature set C=L2, MPLS=feature set D=L3, IPv4-VPN=feature set E=L4, IPV6-VPN=feature set F=L5, and so forth. The operation of the high-level logic of FIGS. 9A-9D for processing a packet on an egress side of a router, based on dynamic control of instruction sets, may be further understood with respect to the following examples.

As depicted in FIGS. 9A-9D, EGR first extracts to_Egress_Hdr 901 from P1, which is followed by certain common processing 902 required for a packet. The common processing may involve lookup of relevant EFTs, based on various parameters in to_Egress_Hdr, to determine certain forwarding actions. It is noted that the associated details are omitted from FIGS. 9A-9D, as those details are not necessary in the current context.

As depicted in FIGS. 9A-9D, the condition 903 checks if to_Egress_Hdr→packet_type is Ethernet.

If condition 903 is true, then it means that P1 is an Ethernet packet which is to be switched in the Ethernet layer alone. Thus, if condition 903 is true, P1 is mapped to feature set A, which is denoted by the code segment 904. While processing in 904, if to_Egress_Hdr→cast_type is either multicast or broadcast (condition 905 is true), then P1 is forwarded on each port specified in to_Egress_Hdr→port list. While processing in 904, if to_Egress_Hdr→cast_type is unicast (condition 905 is false), then P1 is forwarded on to_Egress_Hdr→port. It will be appreciated that, before forwarding to a port, all port specific processings (e.g., addition of a VLAN header or the like) are performed.

If condition 903 is false, which means to_Egress_Hdr→packet_type is not Ethernet, then this is at least a Layer-3 packet (e.g., an IPv4 packet, IPv6 packet, MPLS packet, IPv4-VPN packet, IPv6-VPN packet, or the like). A Layer-3 packet requires resolution of the next-hop IP address specified in to_Egress_Hdr→next_hop to its corresponding egress interface, egress port, and layer-2 header. The resolution is performed by either 907 or 908. The condition 906 checks if to_Egress_Hdr→next_hop→type is IPv6. If condition 906 is true (to_Egress_Hdr→next_hop→type is IPv6), then the next-hop IPv6 address is resolved by looking up the IPv6 Neighbor Discovery (ND) table in 907; otherwise, if condition 906 is false (to_Egress_Hdr→next_hop→type is IPv4), then the next-hop IPv4 address is resolved by looking up the Address Resolution Protocol (ARP) table in (908). In other words, if condition 906 is true then P1 is mapped to feature set C; otherwise, if condition 906 is false, then P1 is mapped to feature set B. Thus, (906) is the classifier for P1 between feature sets B and C.

In FIGS. 9A-9D, the code block 909 illustrates some common processing, such as applying ACLs (Access Control Lists) and extraction of QoS (Quality of Service) parameters configured on the egress_interface obtained from 907 or 908.

In FIGS. 9A-9D, the classification between feature sets B and C is also performed based on to_Egress_Hdr→packet_type. For example, in 910, if to_Egress_Hdr→packet_type is IPv4, then P1 is mapped to feature set B and code block 912 (e.g., which updates the fields in the IPv4 header, such as TTL, TOS/DSCP, checksum, and so forth) is executed; otherwise, in 911, if to_Egress_Hdr→packet_type is IPv6, then P1 is mapped to feature set C and code block 913 (which updates the fields in the IPv6 header, such as Hop Limit, Traffic Class, and so forth) is executed.

In FIGS. 9A-9D, condition 914 subsequently checks if P1 is a VPN packet. This is indicated as being a determination as to whether to_Egress_Hdr-.>is_vpn is true.

If condition 914 is true (P1 is a VPN packet), then code block 916 is executed. While executing code block 916, condition 915 checks if to_Egress_Hdr→packet_type is IPv4 or IPv6. If condition 915 is true (to_Egress_Hdr→packet_type is IPv4), then P1 is mapped to feature set E and code block 917 is executed for IPv4-VPN related processing on P1; otherwise, if condition 915 is false (to_Egress_Hdr→packet_type is IPv6), then P1 is mapped to feature set F and code block 918 is executed for IPv6-VPN related processing. Thus, condition 915 is a classifier for P1 between feature sets E and F. Additionally, code block 919 does some processing which is common between IPv4-VPN and IPv6-VPN. Code block 919 includes a lookup of VPN encapsulation (vpn_encap) and the underlying tunnel related information (vpn_tunneling_info) in VPN specific EFTs by the tuple {to_Egress_Hdr→vpn_identifier, to_Egress_Hdr→vpn_next_hop} as index. In code block 920, VPN encapsulation is prepended onto P1. The condition 921 determines whether the VPN is tunneled over MPLS (i.e., determines whether vpn_tunneling_info→type is MPLS). If condition 921 is true (i.e., vpn_tunneling_info→type is MPLS), then VPN tunneling information is extracted to egress_mpls_info and the code jumps to the location denoted as mpls_encap, for common handling between MPLS packets (i.e to_Egress_Hdr→packet_type is MPLS) and tunneling of VPN packets over MPLS.

If condition 914 is false (P1 is not a VPN packet), then condition 922 determines whether P1 is an MPLS packet (i.e., determines whether to_Egress_Hdr→packet_type is MPLS). If condition 922 is true, P1 is mapped to feature set D and code block 923 is executed. In code block 923, the next-hop forwarding information for the MPLS packet (to_Egress_Hdr→mpls_nexthop_info) is extracted into egress_mpls_info. The Subsequent code that starts from label mpls_encap is the common code between forwarding of MPLS packets and IP-VPN packets, based on processing by egress_mpls_info. Various EFTs are looked up by the indices in egress_mpls_info, to retrieve the next-hop MPLS label stack (which is denoted as mpls_tunnel_encap) which is prepended on P1.

As depicted in FIGS. 9A-9D, code block 927 is common processing performed in P1. In 927, a layer-2 header is prepended onto P1 (indicated in code block 925) and port specific encapsulations (e.g., VLAN tags or the like) are prepended onto P1 (indicated in code block 926). In in code block 928, P1 is finally sent out on egress_port, which terminates the processing of P1 by EGR.

As may be seen from FIGS. 9A-9D, the mapping of P1 to certain feature sets may be possible based on to_Egress_Hdr alone, such as based on the conditions 903, 905, 906, 910, 911, 914+915, 922, and so forth. Certain other mappings may be made based on the combination of to_Egress_Hdr and the result of lookups in EFTs, which have been omitted from FIGS. 9A-9D for purposes of clarity.

Various example embodiments are configured to provide various other functions for supporting mapping of packets to feature sets at the egress by the EGR function.

Various example embodiments are configured to provide various other functions for supporting mapping of packets to feature sets.

Various example embodiments are configured to support upgrading of feature sets (levels).

The packet triggered upgrade of levels of instruction sets may be performed in various ways. However, before considering the packet triggered upgrade of levels of instruction sets more generally, packet triggered upgrade of levels of instruction sets is first described within the context of packet triggered upgrade of levels of instruction sets in EGR (and, more specifically, in EGR implemented as presented with respect to FIGS. 9A-9D). An example of a packet triggered upgrade of levels of instruction sets, from the instruction set of L0@EGR to the instruction set of L1@EGR, is presented with respect to FIGS. 10A-10B and FIGS. 13A-13C. An example of a packet triggered upgrade of levels of instruction sets, from the instruction set of L0@EGR to the instruction set of L1@EGR and then to the instruction set of L2@EGR is presented with respect to FIGS. 10A-10B, FIGS. 13A-13C, and FIGS. 14A-14D. It will be appreciated that, although omitted, a similar capability may be supported for packet triggered upgrade of levels of instruction sets in ING (and, more specifically, in ING implemented as presented with respect to FIGS. 8A-8E).

FIGS. 10A-10B depict an example embodiment of high-level logic of high-level logic of an instruction set, for an egress side of a router, configured to support packet processing and configured to support instruction set upgrades based on dynamic control of instruction sets. More specifically, as indicated above, FIGS. 10A-10B depict an example of a packet triggered upgrade of levels of instruction sets for the instruction set of L0@EGR, which is the subset of FIG. 9 containing instructions for feature set A only. Here, assume that L0@EGR is the currently active instruction set of EGR and the packets processed so far are of type Ethernet only (i.e., condition 1003 is true). So, L0@EGR remains as the Active_EGR_Pointer. Now, further assume that L0@EGR receives a packet P1 with at least the following parameters in to_Egress_Hdr that indicate that Pb is an IPv4 packet: (1) to_Egress_Hdr→packet_type=IPv4, (2) to_Egress_Hdr→next_hop→type=IPv4, and (3) to_Egress_Hdr→is_vpn=false. While processing the packet, condition 1003 is false, so P1 cannot be processed by L0@EGR and an upgrade is needed. The upgrade is executed by the L0@EGR based on the condition 1006, which classifies P1 to either feature set B (=L1) or feature set C (=L2). Here, it is noted that condition 1006 corresponds to condition 906 of FIGS. 9A-9D. As previously discussed with respect to FIGS. 9A-9D, condition 906 maps a packet to a feature set B or feature set C and processes the packet as per the mapping, i.e., using either code block 907 or code block 908, respectively. Similarly, condition 1006 maps a packet into either feature set B or feature set C; however, the mapping results in upgrading the Active_EGR_Pointer to the mapped level by steps 1007 or 1008, since L0@EGR does not include any instructions for the mapped level. This means that L0@EGR can be upgraded to either L1@EGR or L2@EGR. In case of P1, condition 1006 is false and so, upgrading of the level from L0@EGR to L1@EGR is triggered by 1008 using a switch_level( . . . ) procedure that is configured to support upgrading of instruction sets. An example embodiment of a switch_level procedure configured to support upgrading of instruction sets is presented with respect to FIG. 11 and an example embodiment of a method of providing the switch_level procedure configured to support upgrading of instruction sets is presented with respect to FIG. 12.

FIG. 11 depicts an example embodiment of high-level logic for upgrading instruction sets during processing of a packet based on dynamic control of instruction sets. It will be appreciated that the high-level logic of FIG. 11 is configured to support packet triggered upgrades between instruction sets for both ingress (ING) packet processing and egress (EGR) packet processing. As depicted in FIG. 11, the switch_level procedure is based on use of pointers pointing to instruction sets associated with features to be provided for processing of packets. For example, for switching between instruction sets of EGR, the Active_EGR_Pointer is set equal to a base pointer (Base_Pointer) for the next level for the EGR and, as a result, the packet is processed by the instruction set that is pointed to by the Active_EGR_Pointer. Similarly, for example, for switching between instruction sets of ING, the Active_ING_Pointer is set equal to a base pointer (Base_Pointer) for the next level for the ING and, as a result, the packet is processed by the instruction set that is pointed to by the Active_ING_Pointer.

Figure 12:
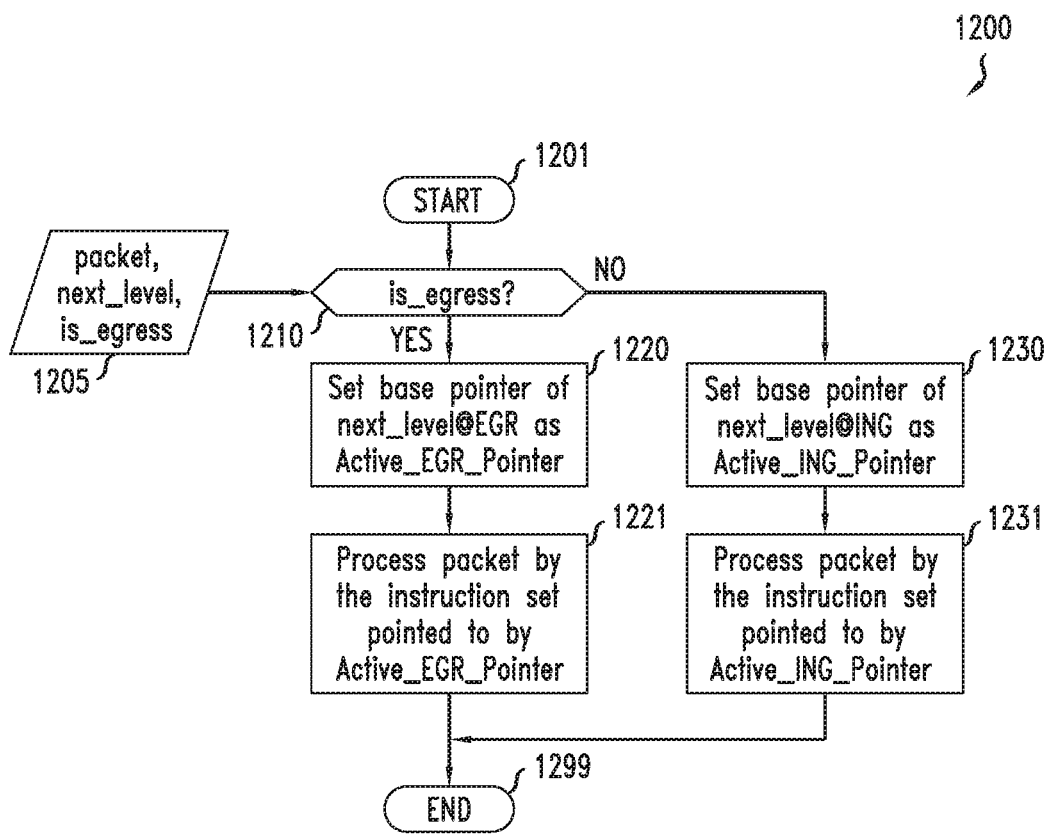
FIG. 12 depicts an example embodiment of a method for upgrading instruction sets during processing of a packet based on dynamic control of instruction sets.
Figure 15:
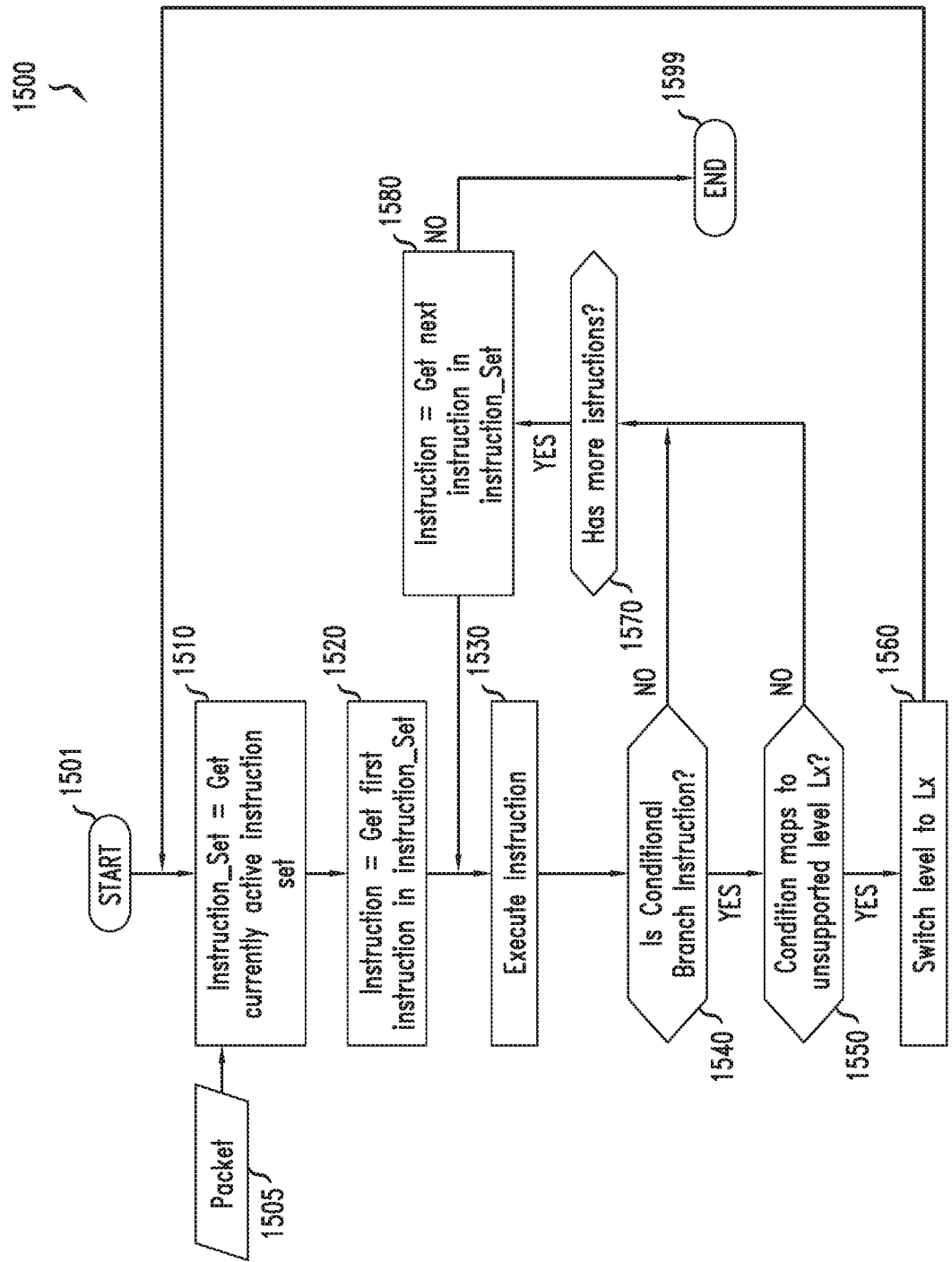
FIG. 15 depicts an example embodiment of a method for supporting instruction set upgrades during processing of a packet based on dynamic control of instruction sets.

FIG. 12 depicts an example embodiment of a method for upgrading instruction sets during processing of a packet based on dynamic control of instruction sets. It will be appreciated that method 1200 of FIG. 12 may be implemented using the high-level logic of FIG. 11. It will be appreciated that method 1200 is configured to support packet triggered upgrades between instruction sets for both ingress (ING) packet processing and egress (EGR) packet processing. At block 1201, method 1200 begins. At block 1210, a determination is made as to whether egress packet processing is being performed, and method 1200 branches as a result (with blocks 1220 and 1221 being performed if egress packet processing is being performed and blocks 1230 and 1231 being performed if ingress packet processing is being performed). For egress packet processing, the base pointer of next_level@EGR is set as Active_EGR_Pointer (block 1220) and the packet is processed by the instruction set that is pointed to by the Active_EGR_Pointer (block 1221), and method 1200 then proceeds to block 1299. For ingress packet processing, the base pointer of next_level@ING is set as Active_ING_Pointer (block 1230) and the packet is processed by the instruction set that is pointed to by the Active_ING_Pointer (block 1231), and method 1200 then proceeds to block 1299. At block 1299, method 1200 ends.

It will be appreciated that the high-level logic for upgrading instruction sets (as presented in FIG. 11) and the associated method for upgrading instruction sets (as presented in FIG. 12) may be further understood by considering a continuation of the example of FIGS. 10A-10B as presented with respect to the examples of FIGS. 13A-13C and FIGS. 14A-14D.

FIGS. 13A-13C depict an example embodiment of high-level logic of an instruction set, for an egress side of a router, configured to support packet processing and configured to support instruction set upgrades based on dynamic control of instruction sets. As indicated above, the example embodiment of FIGS. 13A-13C is a continuation of the example embodiment of FIGS. 10A-10B. More specifically, as indicated above, FIG. 13 depicts the instruction set L1@EGR which is set as the Active_EGR_Pointer after the switch_level procedure (namely, after execution of code block 1008 as depicted in FIGS. 10A-10B). After the switch from L0@EGR to L1@EGR, the packet P1 is processed from the beginning by L1@EGR, which is the subset of FIG. 9 including instructions for feature sets A and B only. As depicted in FIG. 13, the first condition that maps to an unsupported feature triggers upgrading of the level from L1@EGR to the desired level. A packet may upgrade L1@EGR to one of the following levels: L2@EGR in 1107 or 1112, L3@EGR in 1119, L4@EGR in 1117, or L5@EGR in 1118. As previously indicated, for this switch between instruction sets, the switch_level procedure presented with respect to FIG. 11 and FIG. 12 may be used. After the switch from L0@EGR to L1@EGR, the packet P1 is processed completely by L1@EGR and is sent out since all features required by P1 are included in L1@EGR.

FIGS. 14A-4B depict an example embodiment of high-level logic of an instruction set, for an egress side of a router, configured to support packet processing and configured to support instruction set upgrades based on dynamic control of instruction sets. As indicated above, the example embodiment of FIGS. 14A-14D is a continuation of the example embodiments of FIGS. 10A-10B and FIGS. 13A-13C. In this example, assume that, when Active_EGR_Pointer is L0@EGR, the L0@EGR instruction set receives packet P1 with at least the following parameters in to_Egress_Hdr that indicate an IPv6-VPN packet: (1) to_Egress_Hdr→packet_type=IPv6, (2) to_Egress_Hdr→next_hop→type=IPv4, and (3) to_Egress_Hdr→is_vpn=true. While processing P1 by L0@EGR (e.g., using the high-level logic of FIGS. 10A-10B), P1 is mapped to feature set B (e.g., based on condition 1006 in FIGS. 10A-10B), so Active_EGR_Pointer is upgraded to L1@EGR (e.g., based on control block 1008 in FIGS. 10A-10B). While processing P1 by L1@EGR (e.g., using the high-level logic of FIG. 13), P1 is mapped to feature set C (e.g., based on condition 1311 in FIGS. 13A-13C), so Active_EGR_Pointer is upgraded to L2@EGR (e.g., based on control block 1312 in FIGS. 13A-13C). After the switch from L1@EGR to L2@EGR, the packet P1 is processed from the beginning by L2@EGR, which is the subset of FIG. 9 including instructions for feature sets A, B, and C only. FIGS. 14A-14D describe the high level logic of L2@EGR. As depicted in FIGS. 14A-14D, the first condition encountered by P1 that maps to an unsupported feature triggers upgrading of level from L2@EGR to the desired level. P1 may upgrade L2@EGR to one of the following levels: L3@EGR in 1419, L4@EGR in 1417, or L5@EGR in 1418. While processing P1 by L2@EGR in FIGS. 14A-14D, condition 1414 is true, so condition 1415 is executed. For P1, the condition 1415 is false, so P1 is mapped to feature set F and 1418 upgrades Active_EGR_Pointer to L5@EGR. P1 is processed from the beginning by L5@EGR, which completes processing of P1 and sends out P1. Subsequent packets are processed by L5@EGR until a packet requiring a higher-level feature upgrades it further. It will be appreciated that L5@EGR contains feature sets A, B, C, D, E, and F only. It will be appreciated that the description of L5@EGR is omitted from FIG. 14 since it includes all of the pseudocode described in FIG. 9. As previously indicated, for each such switch between instruction sets, the switch_level procedure presented with respect to FIG. 11 and FIG. 12 may be used.

Figure 17:
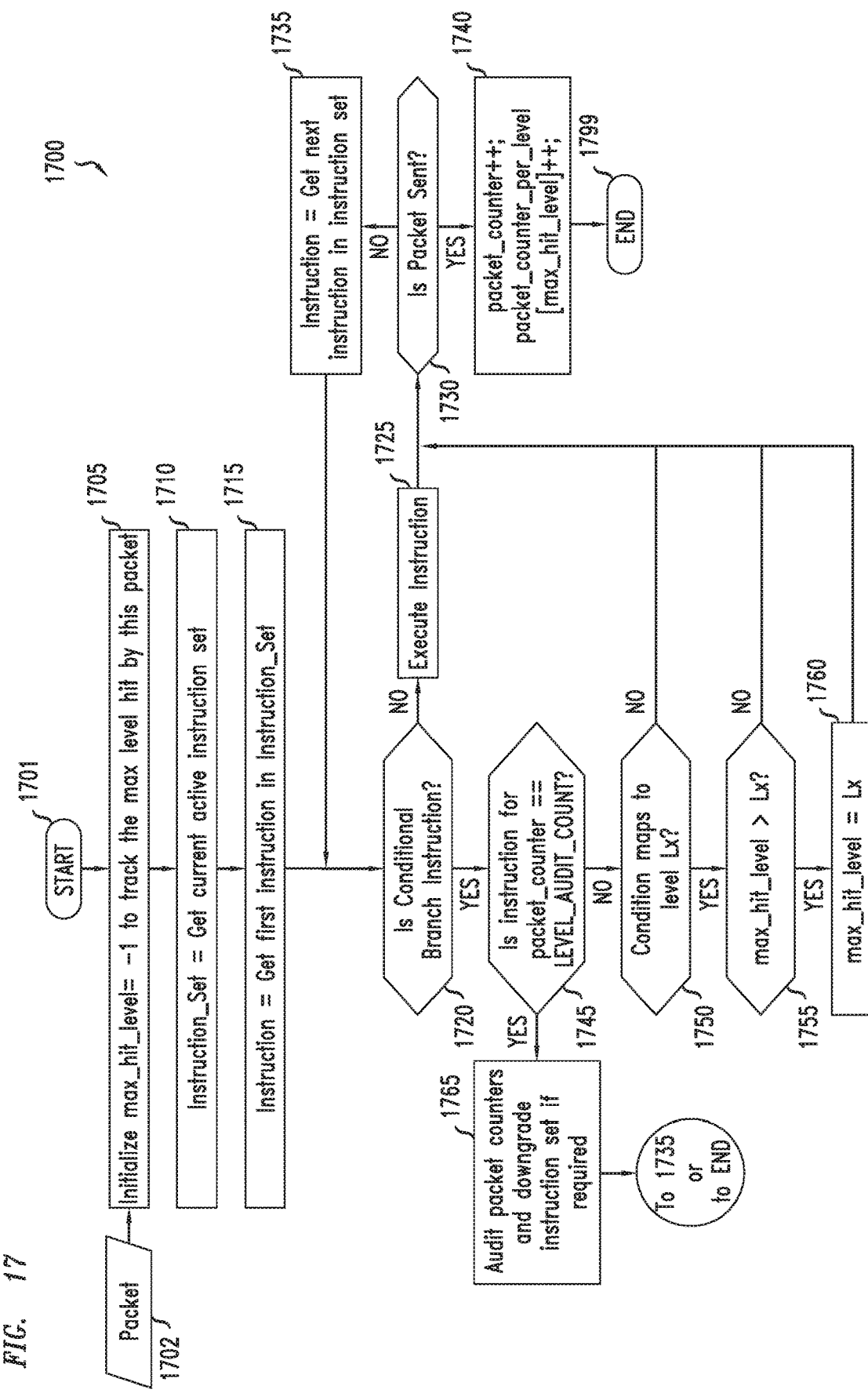
FIG. 17 depicts an example embodiment of a method for supporting instruction set downgrades during processing of a packet based on dynamic control of instruction sets using packet counters.

FIG. 17 depicts an example embodiment of a method for supporting instruction set upgrades during processing of a packet based on dynamic control of instruction sets. It will be appreciated that method 1500 is configured to support packet triggered upgrades between instruction sets for both ingress (ING) packet processing and egress (EGR) packet processing. At block 1501, method 1500 begins. At block 1510, the currently active instruction set is retrieved for processing the packet 1505. At block 1520, the first instruction in the currently active instruction set is retrieved. At block 1530, the instruction (which may be the first instruction of the currently active instruction set based on block 1520 or a subsequent instruction of the currently active instruction set based on block 1580) is executed. At block 1540, a determination is made as to whether the executed instruction is a condition branch instruction. If the executed instruction is not a conditional branch instruction, then method 1500 proceeds to block 1570. If the executed instruction is a conditional branch instruction, then method 1500 proceeds to block 1550. At block 1550, a determination is made as to whether the condition maps to an unsupported level (i.e., to a feature that is required for processing the packet, but which is not supported by the currently active instruction set). If the condition does not map to an unsupported level (i.e., it maps to a feature that is supported by the currently active instruction set), then method 1500 proceeds to block 1570. If the condition does map to an unsupported level (i.e., it maps to a feature that is not supported by the currently active instruction set), then method 1500 proceeds to block 1560. At block 1560, a switch from the current level (i.e., the currently active instruction set which does not support the feature needed for processing the packet) to a higher level (i.e., a newly selected instruction set that does support the feature needed for processing the packet) is performed. This switch may be performed by executing a switch_level( . . . ) procedure configured to support instruction set upgrades (e.g., as presented with respect to FIGS. 11 and 12). From block 1560, method 1500 returns to block 1510 to retrieve the newly selected instruction set and to begin processing the packet using the newly selected instruction set. In other words, the newly selected instruction set that is selected based on the upgrade becomes the currently selected instruction set for the next pass through method 1500. At block 1570, which may be reached based on a determination that the executed instruction is not a conditional branch instruction (at block 1540) or a determination that the executed instruction is a conditional branch in which the condition does not map to an unsupported level (at block 1550), a determination is made as to whether the currently selected instruction set includes additional instructions that need to be executed. If the currently selected instruction set does not include additional instructions that need to be executed, then method 1500 proceeds to block 1599. If the currently selected instruction set includes additional instructions that need to be executed, then method 1500 proceeds to block 1580. At block 1580, the next instruction in the currently active instruction set is retrieved and method 1500 then returns to block 1530 for executing that next instruction. At block 1599, method 1500 ends.

Various example embodiments are configured to provide various other functions for supporting upgrading of feature sets (levels).

Various example embodiments are configured to support downgrading of feature sets (levels).

The downgrading of levels of instruction sets may be performed responsive to various conditions, such a detected change in packet flows, expiration of a timer, or the like, as well as various combinations thereof.

In at least some example embodiments, packet driven downgrading of levels based on detection of change in packet flows may be provided. The detection of change in packet flows may be based on use of a set of packet counters. In at least some example embodiments, for example, each of ING or EGR may employ the following packet counters independently: (1) packet_counter_per_level[LEVEL_MAX]=set of packet counters, one per level and (2) packet_counter=counter that increments for every packet. Whenever a level switch is performed by the switch_level( . . . ) procedure, these counters are reset to value 0. While processing a packet, the instruction set tracks various level-specific features hit by the packet. At the end of processing of the packet, the packet_counter_per_level is incremented for the highest level that was hit by the packet. It will be appreciated that other packet counters or combinations of packet counters may be used to support packet driven downgrading of levels based on detection of change in packet flows. The packet triggered downgrade of levels of instruction sets based on use of packet counters for detection of change in packet flows may be performed in various ways. However, before considering the packet triggered downgrade of levels of instruction sets more generally, packet triggered downgrade of levels of instruction sets is first described within the context of packet triggered downgrade of levels of instruction sets in EGR (and, more specifically, in EGR implemented as presented with respect to FIGS. 9A-9D). An example of a packet triggered downgrade of levels of instruction sets, from the instruction set of L2@EGR to the instruction set of L0@EGR, is presented with respect to FIGS. 14A-14D and FIGS. 16A-16F. It will be appreciated that, although omitted, a similar capability may be supported for packet triggered downgrade of levels of instruction sets in ING (and, more specifically, in ING implemented as presented with respect to FIGS. 8A-8E).

FIGS. 16A-16F depict an example embodiment of high-level logic of an instruction set, for an egress side of a router, configured to support packet processing and configured to support instruction set downgrades based on dynamic control of instruction sets. FIGS. 16A-16F include the L2@EGR from FIGS. 14A-14D, with the additional logic for incrementing packet counter for levels L0-L2. It is noted that the mapping of a packet to included levels is done using the same logic as presented in FIG. 9. In FIGS. 16A-16F, max_hit_level 1601 is used to track the max level hit during processing of a packet. If a packet is received with to_Egress_Hdr→packet_type as Ethernet, then condition 1602 is decisive that max_hit_level as L0. Accordingly, 1603 sets the max_hit_level as L0. After sending the packet, the packet_counter_per_level and packet_counter are updated either in 1604, 1605 or in 1606, 1607. If a packet is received with to_Egress_Hdr→packet_type as IPv4 or IPv6, then conditions 1608, 1609 set the max_hit_level to either L1 or L2. After the packet is sent out, the counters are updated. 1610 sets the max_hit_level to L2, if none of the lower levels are hit (that means the packet indeed needed L2). Then, the packet counters are incremented in 1611, 1612. This mode of packet tracking continues until the total number of packets forwarded by the instruction set reaches a certain value, which is denoted as LEVEL_AUDIT_COUNT. At the beginning of processing a packet, an instruction set checks if packet_count is LEVEL_AUDIT_COUNT in condition 1613. If the condition is true, then auditing is performed to check and downgrade the level, if needed. The code block 1614 gets the highest level for which packet_counter_per_level[ ] has non-zero value. If the highest level exercised is less than the level of the instruction set (i.e., L2 in this context) such that the condition 1615 is true, then a downgrade is performed by invoking the switch_level( . . . ) procedure. If the highest level exercised is not less than the level of the instruction set (i.e., L2 in this context) such that the condition 1615 is false, then packet_counter_per_level[ ] and packet_counter are reset to 0 to mark the beginning of the next audit window.

FIG. 17 depicts an example embodiment of a method for switching between instruction sets during processing of a packet based on dynamic control of instruction sets. It will be appreciated that method 1700 is configured to support packet triggered downgrades between instruction sets for both ingress (ING) packet processing and egress (EGR) packet processing. At block 1701, method 1700 begins. At block 1705, a max_hit_level variable is initialized to track the max level hit by a packet 1702 that is to be processed (e.g., initialized to a value of −1). At block 1710, the currently active instruction set is retrieved for processing the packet 1702. At block 1715, the first instruction in the currently active instruction set is retrieved. At block 1720, a determination is made as to whether the currently selected instruction (which may be the first instruction of the currently active instruction set based on block 1715 or a subsequent instruction of the currently active instruction set based on block 1735) is a conditional branch instruction. If the currently selected instruction is a conditional branch instruction, then method 1700 proceeds to block 1745. If the currently selected instruction is not a conditional branch instruction, then method 1700 proceeds to block 1725. At block 1725, which is entered from block 1720 based on a determination that the currently selected instruction is not a conditional branch instruction, the currently selected instruction is executed. At block 1730, a determination is made as to whether the packet 1702 is sent after execution of instruction at block 1725. If the packet 1702 is sent, method 1700 proceeds to block 1740. If the packet 1702 is not sent, method 1700 proceeds to block 1735. At block 1735, a next instruction in the currently active instruction set is retrieved from the currently active instruction set. From block 1735, method 1700 returns to block 1720, at which point that next instruction in the currently active instruction set is executed. At block 1740, the packet_counter and packet_counter_per_level [max_hit_level] variables are incremented. From block 1740, method 1700 proceeds to block 1799, where method 1700 ends. At block 1745, which is entered from block 1720 based on a determination that the currently selected instruction is a conditional branch instruction, a determination is made as to whether the packet_counter is equal to LEVEL_AUDIT_COUNT. If the packet_counter is equal to LEVEL_AUDIT_COUNT, then method 1700 proceeds to block 1765. If the packet_counter is not equal to LEVEL_AUDIT_COUNT, then method 1700 proceeds to block 1750. At block 1750, which is entered from block 1745 based on a determination that the packet_counter is not equal to LEVEL_AUDIT_COUNT, At block 1750, which is entered from block 1745 based on a determination that the packet_counter is not equal to LEVEL_AUDIT_COUNT a determination is made as to whether the condition maps to an particular level Lx (i.e., to a feature that is required for processing the packet). If the condition does not map to the level Lx, then method 1700 proceeds to block 1730, at which point a determination is made as to whether the packet 1702 is sent. If the condition does map to the level Lx, then method 1700 proceeds to block 1755. At block 1755, a determination is made as to whether max_hit_level is less than level Lx. If max_hit_level is not less than level Lx, then method 1700 proceeds to block 1730, at which point a determination is made as to whether the packet 1702 is sent. If max_hit_level is less than level Lx, then method 1700 proceeds to block 1760. At block 1760, the max_hit_level is set equal to the level Lx. From block 1760, method 1700 proceeds to block 1730, at which point a determination is made as to whether the packet 1702 is sent. At block 1765, which is entered from block 1745 based on a determination that the packet_counter is equal to LEVEL_AUDIT_COUNT, the packet counters (packet_counter and packet_counter_per_level) are audited and a determination is made as to whether or not an instruction set downgrade is to be performed). An example embodiment for determining, based on auditing of packet counters, whether not an instruction set downgrade is to be performed is presented with respect to FIG. 18. From block 1765, method 1700 proceeds either to block 1735 (if an instruction set downgrade is not to be performed and processing of the packet 1702 using the current instruction level is to continue) or to block 1799 (if an instruction set downgrade is to be performed and the packet is to be re-processed using method 1700 at the lower instruction level). At block 1799, as previously indicated, method 1700 ends.

Figure 18:
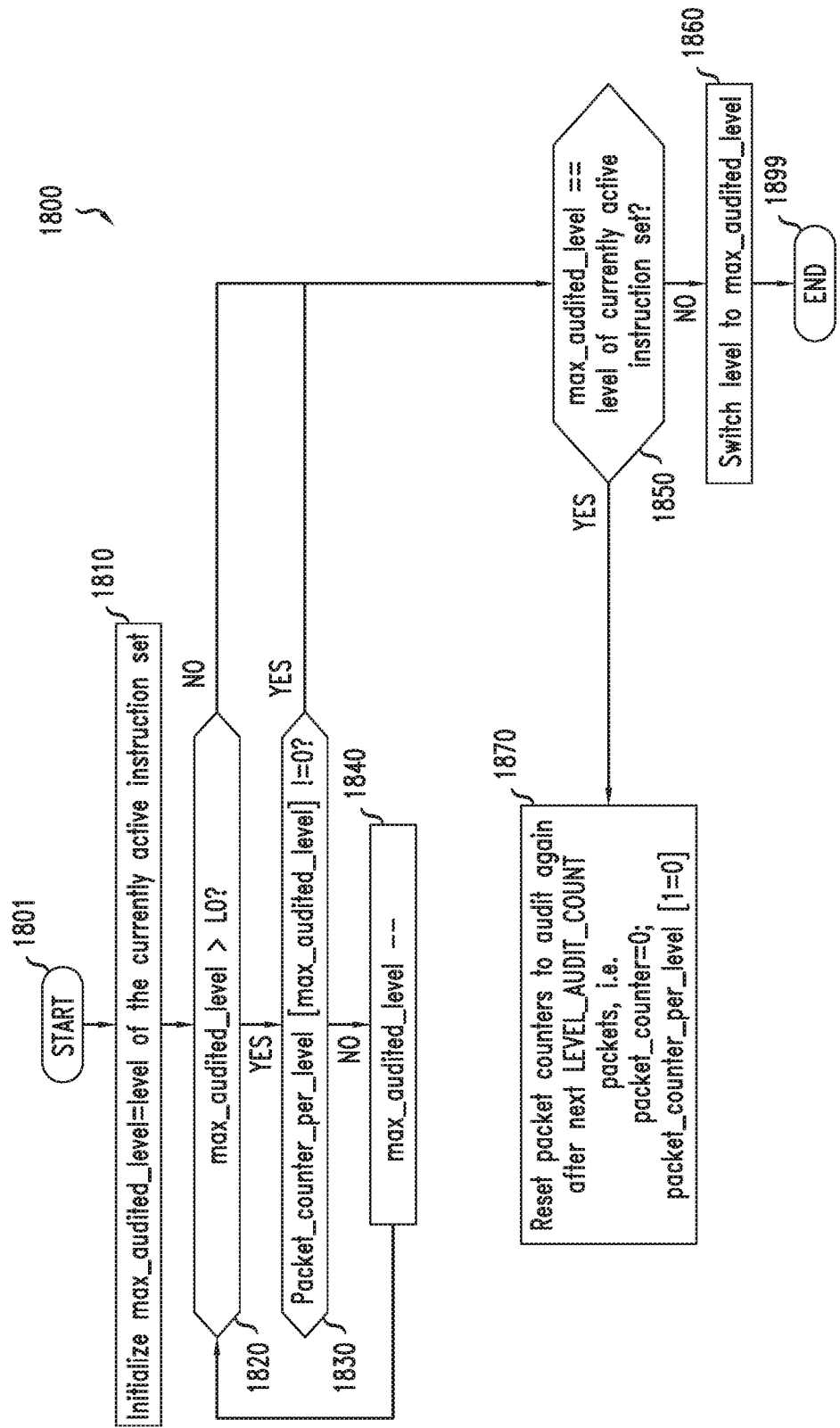
FIG. 18 depicts an example embodiment of a method for supporting instruction set downgrades during processing of a packet based on dynamic control of instruction sets using packet counters.

FIG. 18 depicts an example embodiment of a method for supporting instruction set downgrades during processing of a packet based on dynamic control of instruction sets using packet counters. The method 1800 of FIG. 18 may be used as block 1765 of method 1700 of FIG. 17 (for determining, based on auditing of packet counters, whether an instruction set downgrade is to be performed). At block 1801, method 1800 begins. At block 1810, a max_audited_level variable is initialized to the instruction set level of the currently active instruction set. At block 1820, a determination is made as to whether the max_audited_level is greater than level L0. If the max_audited_level is not greater than level L0, then method 1800 proceeds to block 1850. If the max_audited_level is greater than level L0, then method 1800 proceeds to block 1830. At block 1830, a determination is made as to whether the packet_counter_per_level of the max_audited_level is equal to zero or not equal to zero. If the packet_counter_per_level of the max_audited_level is not equal to zero, method 1800 proceeds to block 1850. If the packet_counter_per_level of the max_audited_level is equal to zero, method 1800 proceeds to block 1840. At block 1840, the max_audited_level is decremented. From block 1840, method 1800 returns to block 1820. At block 1850, which may be entered from block 1820 or block 1830, a determination is made as to whether the max_audited_level is equal to the instruction set level of the currently active instruction set. If the max_audited_level is equal to the instruction set level of the currently active instruction set, then method 1800 proceeds to block 1870. If the max_audited_level is equal to the instruction set level of the currently active instruction set, method 1800 proceeds to block 1860. At block 1860, a switch from the current level (i.e., the currently active instruction set) to a lower level (i.e., the max_audited_level) is performed. This switch may be performed by executing a switch_level( . . . ) procedure configured to support instruction set downgrades (e.g., as presented with respect to FIGS. 19 and 20). From block 1860, method 1800 proceeds to block 1899, where method 1800 ends (and it will be appreciated that, where method 1800 is used to provide block 1765 of method 1700 of FIG. 17, this may correspond to proceeding to block 1799 of method 1700 of FIG. 17). At block 1870, the packet counters are reset (e.g., packet_counter=0 and packet_counter_per_level=0) for auditing again after next LEVEL_AUDIT_COUNT packets. From block 1870, method 1800 proceeds to block 1899, where method 1800 ends (and it will be appreciated that, where method 1800 is used to provide block 1765 of method 1700 of FIG. 17, this may correspond to proceeding to block 1735 of method 1700 of FIG. 17). At block 1899, as indicated above, method 1800 ends.

FIG. 19 depicts an example embodiment of high-level logic for downgrading instruction sets during processing of a packet based on dynamic control of instruction sets. It will be appreciated that the high-level logic of FIG. 19 is configured to support packet triggered downgrades between instruction sets for both ingress (ING) packet processing and egress (EGR) packet processing. As depicted in FIG. 19, the switch_level procedure is similar to the switch_level procedure of FIG. 11, but also includes packet counters (illustratively, the packet_counter and packet_counter_per_level counters) configured to support packet triggered downgrades between instruction sets. The packet_counter and packet_counter_per_level counters are reset to 0 before changing the active instruction set. As further depicted in FIG. 19, the switch_level procedure is based on use of pointers pointing to instruction sets associated with features to be provided for processing of packets. For example, for switching between instruction sets of EGR, the Active_EGR_Pointer is set equal to a base pointer (Base_Pointer) for the next level for the EGR and, as a result, the packet is processed by the instruction set that is pointed to by the Active_EGR_Pointer. Similarly, for example, for switching between instruction sets of ING, the Active_ING_Pointer is set equal to a base pointer (Base_Pointer) for the next level for the ING and, as a result, the packet is processed by the instruction set that is pointed to by the Active_ING_Pointer.

Figure 20:
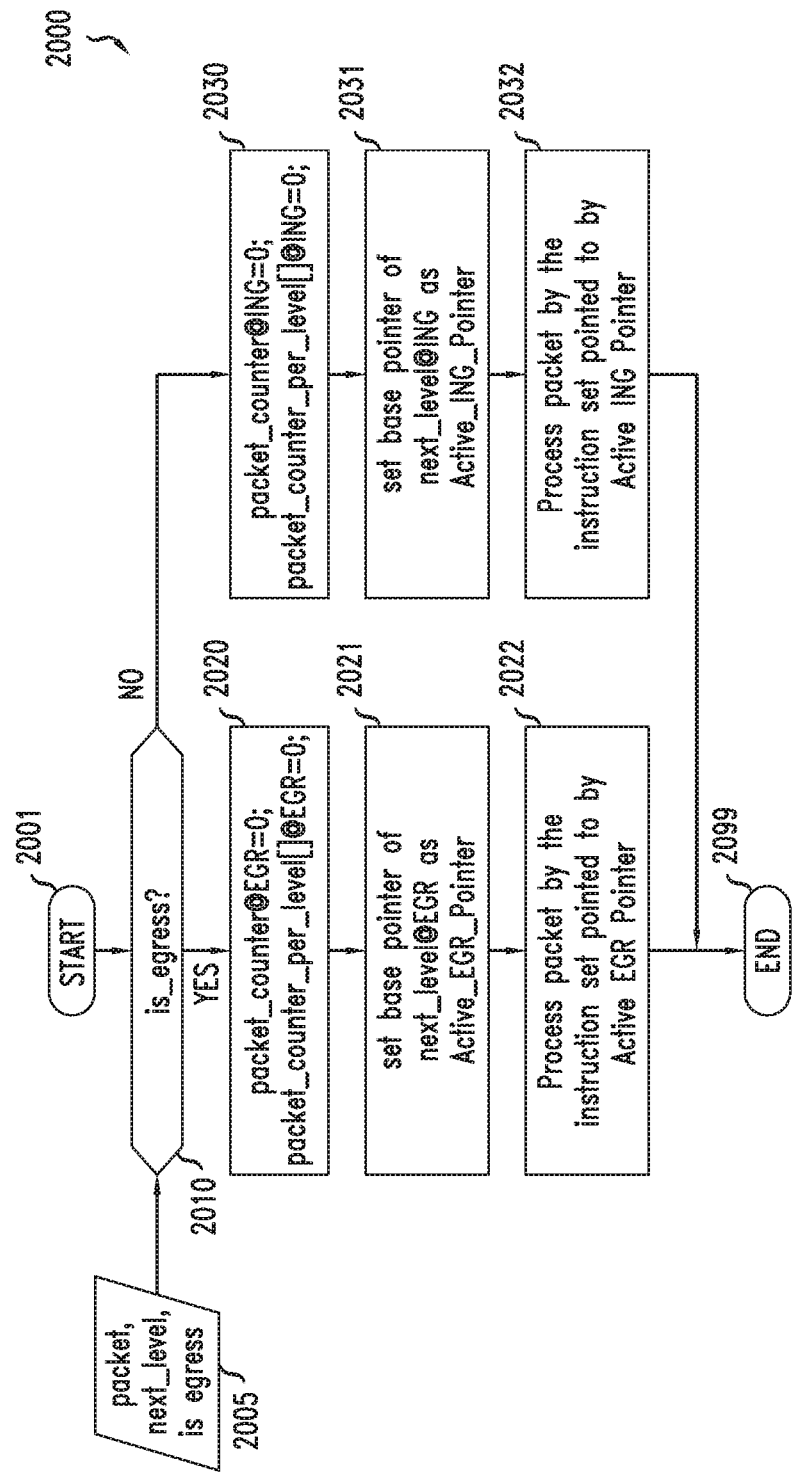
FIG. 20 depicts an example embodiment of a method for downgrading instruction sets during processing of a packet based on dynamic control of instruction sets.

FIG. 20 depicts an example embodiment of a method for downgrading instruction sets during processing of a packet based on dynamic control of instruction sets. It will be appreciated that method 2000 of FIG. 20 may be implemented using the high-level logic of FIG. 19. It will be appreciated that method 2000 is configured to support packet triggered downgrades between instruction sets for both ingress (ING) packet processing and egress (EGR) packet processing. As depicted in FIG. 20, the method 2000 configured to support packet triggered downgrades between instruction sets is similar to the method 1200 that is configured to support packet triggered upgrades between instruction sets, but also includes support for packet counters (illustratively, the packet_counter and packet_counter_per_level counters) configured to support packet triggered downgrades between instruction sets. At block 2001, method 2000 begins. At block 2010, a determination is made as to whether egress packet processing is being performed, and method 1200 branches as a result (with blocks 2020-2022 being performed if egress packet processing is being performed and blocks 2030-2032 being performed if ingress packet processing is being performed). For egress packet processing, the packet counters for egress processing are reset as packet_counter@EGR=0 and packet_counter_per_level[ ]@EGR=0 (block 2021), the base pointer of next_level@EGR is set as Active_EGR_Pointer (block 2021), and the packet is processed by the instruction set that is pointed to by the Active_EGR_Pointer (block 2022), and method 2000 then proceeds to block 2099. For ingress packet processing, the packet counters for ingress processing are reset as packet_counter@ING=0 and packet_counter_per_level[ ]@ING=0 (block 2031), the base pointer of next_level@ING is set as Active_ING_Pointer (block 2031), and the packet is processed by the instruction set that is pointed to by the Active_ING_Pointer (block 2032), and method 2000 then proceeds to block 2099. At block 2099, method 2000 ends.

It will be appreciated that the high-level logic for downgrading instruction sets (as presented in FIG. 19) and the associated method for downgrading instruction sets (as presented in FIG. 20) may be further understood by way of reference to the example of FIGS. 16A-16F.

In at least some example embodiments, downgrading of levels based on expiration of a timer may be provided. The forwarding plane may employ a timer that is configured to expire periodically (e.g., every 30 seconds, every minute, every five minutes, or the like), at which time the instruction sets of the forwarding plane may be downgraded to the lowest level (e.g., L0). The processing of subsequent packets following the downgrading of the levels of instruction sets will then trigger upgrades to the correct level using various capabilities for upgrading of levels of instruction sets as discussed herein. It will be appreciated that such conditions may be used as the basis for downgrading of levels of instruction sets where such downgrades cannot be performed (or at least cannot be performed relatively easily) on a packet triggered basis due to the arrangement of the instruction sets. The downgrading of levels of instruction sets may be further understood with respect to the following example.

In continuation of various examples provided above for the upgrading of levels of instruction sets, assume that the active instruction set is currently running at the level L5 (=feature set F). Now, assume that all features in feature set F are deconfigured in the router, so that the forwarding plane is no longer receiving packets for feature set F. In that case, it is desirable for the instruction set to downgrade to at least level L4 (=feature set E). However, detection of the opportunity for downgrading from feature set F generally cannot be made while processing a packet by the instruction set for feature set F at level L5. As such, as indicated above, various conditions (e.g., expiration of a timer, a detected change in packet flows, or the like) may be used to trigger downgrading of the level from L5 to L0, and then processing of subsequent packets will result in dynamic upgrading of the level from L0 to the level needed to process the packets being received.

Various example embodiments are configured to provide various other functions for supporting downgrading of feature sets (levels).

Various example embodiments are configured to support upgrading of feature sets (levels) based on configuration summary tables.

In general, certain features that may be associated with a packet are not discovered until a later stage of processing the packet, i.e., after the headers on the packet are modified. It is desirable that some of such features are included from a specific level onwards only. Unless a packet requires the feature, the forwarding program can operate at a level below the level required by the feature. Once the feature is demanded, the program can be switched to the level required by the feature. However, in order to support dynamic switching between levels, the level switching is performed before the packet is modified, since the upgraded level needs to process the packet from the beginning. In at least some embodiments, a configuration summary table (CST) is introduced in the forwarding plane where the CST is configured to track entries across various tables (e.g., IFTs or EFTs) that are programmed with various conditions needed at various levels of instruction sets, thereby obviating the need to include certain conditions at certain levels of instruction sets. The use of CSTs in this manner may be further understood by way of reference to the example of FIGS. 21-23.

FIG. 21 depicts an example embodiment of high-level logic for processing a packet on ingress and egress sides of a router based on dynamic control of instruction sets using a configuration summary table. More specifically, FIG. 21 depicts a further generalization of ING in FIGS. 8A-8E or EGR in FIGS. 9A-9D in abstract terms. Here, assume that the instruction set program is currently operating at L0 that includes support for feature set A only. The program is processing a packet P1. During processing of P1, condition at step 2102 is true, so steps 2103-2105 are executed. The step 2103 adds the header H1 on the packet. On further processing, the condition at step 2108 is true, so step 2109-2111 are executed. The step 2109 modifies the existing header H2 in the packet. On further processing, condition_1_for_B9 at step 2114 is true, i.e., a condition associated with feature B9 in feature set B. This requires the program to be at level L1. Since the current level is L0, the packet requires hot swapping of the active instruction set from L0 to L1. After hot swapping to level L1, the packet P1 would be processed again from the beginning by the instruction set at L1. However, the hot swapping is not possible at this point since P1 is already modified at steps 2103 and 2109, and thus, cannot be processed from the beginning by the L1 instruction set. As may be seen from this example, condition_1_for_B9 will not be determined prior to step 2103, wherein the first modification to the packet takes place. The condition_1_for_B9 is result of lookup of table T5 with index (X+Y) at step 2107, i.e., condition_1_for_B is the state TX11 in the table entry. The indices X and Y are dependent on the computations performed on the packet specific parameters and subsequent table lookups after step 2103. This means B9 should be included at the level L0 instruction set too, which reduces the potential benefits of dynamic control of instruction sets. In order to include B9 in the instruction sets from level L1 onwards only, the concept of the CST is introduced in the forwarding plane. The CST tracks the total number of entries across various tables that are programmed with the condition for B9. In the example above, TX4 in an entry of table T15 is the condition for B9. Similarly, there could be other tables (not shown in in the example) which also may include conditions for B9. For example, assume that TX2 in an entry of table T32 and TX6 in an entry of table T52 are conditions for B9. The number of such entries in tables is depicted in FIG. 22, which illustrates a configuration summary table for use with the example embodiment of high-level logic of FIG. 21.

FIG. 22 depicts an example embodiment of a configuration summary table for use with the example embodiment of high-level logic of FIG. 21. Here, the tables T15, T32, T52 may be referred to as child tables of the CST (even though CST is not the cause for the child tables and, in fact, it is the other way around). In FIG. 22, the CST has only one entry, i.e., index 0. The entry contains an aggregate count of B9 specific configurations in the forwarding plane—i.e., number of entries in T32 with TX2 as true+number of entries in T52 with TX6 as true+number of entries in T15 with TX4 as true. As depicted: (1) T32 has 3 such entries in indices 1, 2000, and 8000, (2) T52 has 2 such entries in indices 2 and 501, and (3) T15 has two such entries in indices 1 and 1001. So, the B9 configuration count in CST is 7. Similarly, the CST also may include the total number of configurations for other features linked to various levels which are detected at a later stage of processing the packet.

In general, the CST is not visible to the control plane, but, rather, is built and maintained internally by the forwarding plane. Whenever the level specific feature in a child table entry is programmed for the first time, then configuration count corresponding to feature in the CST is incremented. Whenever the level specific feature in a child table entry is deprogrammed, then configuration count corresponding to feature in CST is decremented. During early stage of processing the packet, the CST is looked up to see if a level specific feature is programmed in the forwarding plane, i.e., if the count is non-zero. If the count is non-zero, then the forwarding plane program is switched to the level associated with the feature. This is illustrated in the program in FIG. 23, which is the same as FIG. 21 but enhanced with the CST lookup and with steps 2113-2114 removed.

FIG. 23 depicts an example embodiment of high-level logic for processing a packet on ingress and egress sides of a router based on dynamic control of instruction sets using a configuration summary table. As indicated above, the high-level logic of FIG. 23 is similar to the high-level logic of FIG. 21, with the exception that steps 2113-2114 have been removed and the high-level logic has been enhanced with the CST lookup capability. In FIG. 23, during the initial stages of processing the packet P1, CST entry at index 0 is looked up to check number of configurations for B9. If non-zero, then the forwarding plane is hot swapped from L0 to L2. Note that it is possible that P1 actually may not require feature B9. For example, at step 2312, the value of (X+Y) could be 500, so the entry at index 500 is looked up in T15 wherein TX4 is false, but P1 will still upgrade the level from L0→L2. In other words, if B9 is programmed into the forwarding plane then any packet will upgrade the forwarding plane program to the L2.

Various example embodiments are configured to provide various other functions for supporting upgrading of feature sets (levels) based on configuration summary tables.

Figure 24:
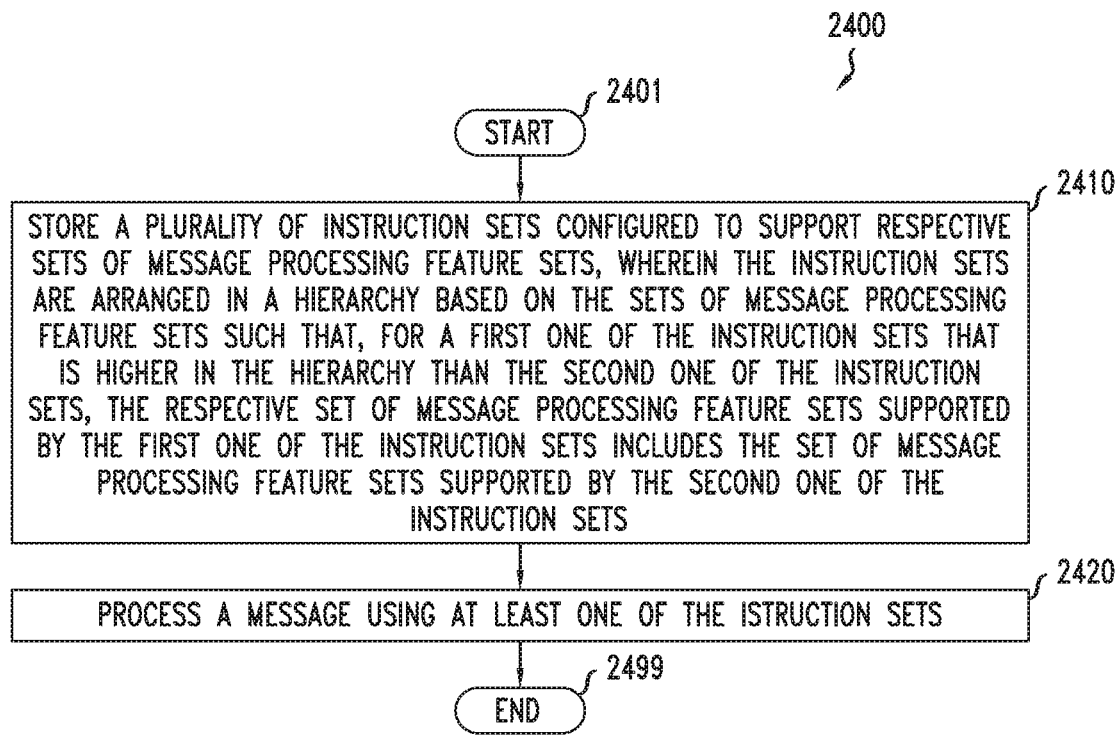
FIG. 24 depicts an example embodiment of a method for processing a message using dynamic control of processor instruction sets.

FIG. 24 depicts an example embodiment of a method for processing a message using dynamic control of processor instruction sets. It will be appreciated that, although primarily presented as being performed serially, at least a portion of the functions of method 2400 may be performed contemporaneously or in a different order than as presented with respect to FIG. 24. At block 2401, method 2400 begins. At block 2410, store a plurality of instruction sets configured to support respective sets of message processing feature sets, wherein the instruction sets are arranged in a hierarchy based on the sets of message processing feature sets such that, for a first one of the instruction sets that is higher in the hierarchy than a second one of the instruction sets, the respective set of message processing feature sets supported by the first one of the instruction sets includes the set of message processing feature sets supported by the second one of the instruction sets. At block 2420, process a message using at least one of the instruction sets. At block 2499, method 2400 ends. In at least some example embodiments, for each of the instruction sets, the respective set of message processing feature sets supported by the respective instruction set includes the respective sets of message processing feature sets of each of the instruction sets lower in the hierarchy than the respective instruction set. In at least some example embodiments, only one of the instruction sets is active at a time for processing the message. In at least some example embodiments, to process the message using at least one of the instruction sets, the processor is configured to process the message using an active instruction set, wherein the active instruction set is one of the instruction sets that is active for the processor when processing of the message begins. In at least some example embodiments, the processor is configured to determine, during processing of the message using the active instruction set, a mapped instruction set for the message, wherein the mapped instruction set is one of the instruction sets supporting the set of message processing feature sets determined to be needed for processing the message. In at least some example embodiments, the mapped instruction set for the message is determined prior to modification of the message based on processing of the message using the active instruction set. In at least some example embodiments, the processor is configured to complete, based on a determination that the mapped instruction set for the message and the active instruction set are the same, processing of the message using the active instruction set. In at least some example embodiments, the processor is configured to initiate, based on a determination that the mapped instruction set for the message and the active instruction set are different, a switch of the active instruction set from the one of the instruction sets that is active for the processor when processing of the message begins to the mapped instruction set for the message. In at least some example embodiments, the processor is configured to restart processing of the message using the active instruction set, wherein the active instruction set is the mapped instruction set for the message. In at least some example embodiments, to process the message using at least one of the instruction sets, the processor is configured to select, dynamically based on the message, a selected one of the instruction sets for processing the message and process the message using the selected one of the instruction sets. In at least some example embodiments, to process the message using at least one of the instruction sets, the processor is configured to switch from a selected one of the instruction sets to a newly selected one of the instruction sets and process the message using newly selected one of the instruction sets. In at least some example embodiments, the switch from the selected one of the instruction sets to the newly selected one of the instruction sets is based on processing of the message. In at least some example embodiments, the switch from the selected one of the instruction sets to the newly selected one of the instruction sets is based on a determination that a given message processing feature set needed for processing the message is available from the newly selected one of the instruction sets. In at least some example embodiments, the newly selected one of the instruction sets is at a higher level of the hierarchy than the selected one of the instruction sets. In at least some example embodiments, the switch from the selected one of the instruction sets to the newly selected one of the instruction sets is based on use of a set of packet counters. In at least some example embodiments, the newly selected one of the instruction sets is at a lower level of the hierarchy than the selected one of the instruction sets. In at least some example embodiments, the switch from the selected one of the instruction sets to the newly selected one of the instruction sets is based on use of a periodic timer. In at least some example embodiments, the newly selected one of the instruction sets is at a lowest level of the hierarchy. In at least some example embodiments, to process the message using at least one of the instruction sets, the processor is configured to determine, using a configuration summary table and during processing of the message, whether the configuration summary table includes an indication that a given message processing feature set of a given one of the instruction sets is active for the plurality of instruction sets, switch to the given one of the instruction sets, and process the message using the given one of the instruction sets. In at least some example embodiments, the indication that the given message processing feature set of the given one of the instruction sets is active for the plurality of instruction sets is set into the configuration summary table based on a detection of at least one forwarding state associated with the given message processing feature set. In at least some example embodiments, the configuration summary table is used for early detection indication that the given message processing feature set of the given one of the instruction sets is active for the plurality of instruction sets. In at least some example embodiments, the sets of instruction sets are configured to support a packet processing application, wherein a first one of the instruction sets is configured to support processing of Ethernet packets and a second one of the instruction sets is configured to support processing of Internet Protocol (IP) packets. It will be appreciated that various message processing functions presented herein with respect to FIGS. 1-23 may be incorporated within the context of method 2400 of FIG. 24.

Figure 25:
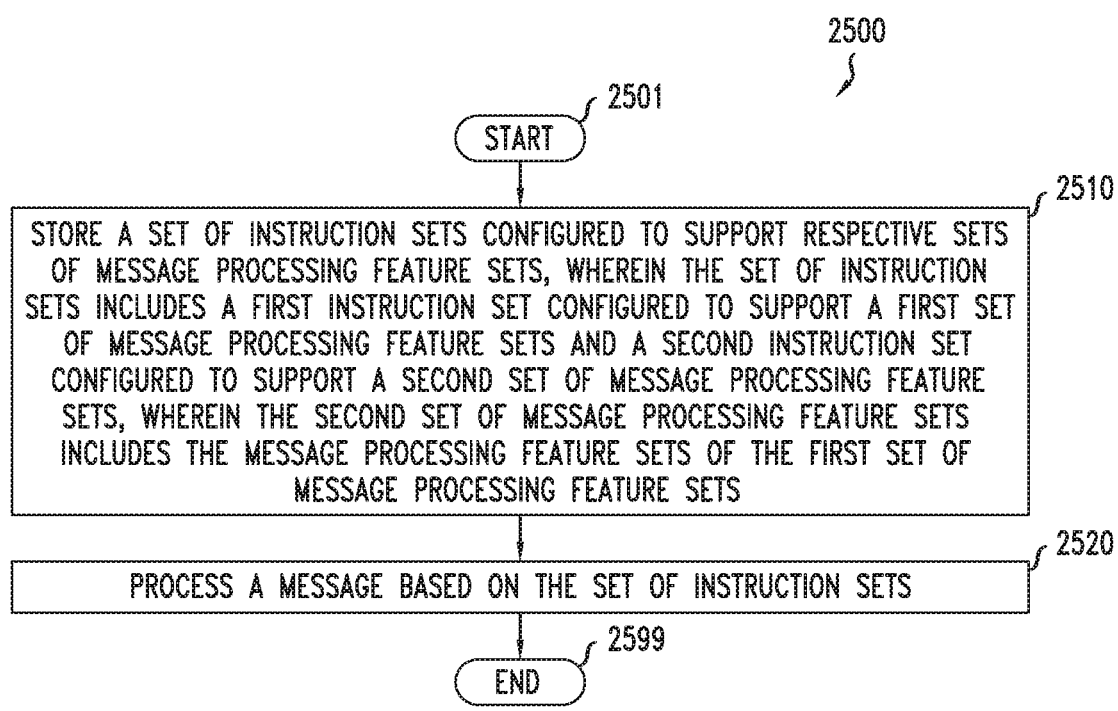
FIG. 25 depicts an example embodiment of a method for processing a message using dynamic control of processor instruction sets.

FIG. 25 depicts an example embodiment of a method for processing a message using dynamic control of processor instruction sets. It will be appreciated that, although primarily presented as being performed serially, at least a portion of the functions of method 2500 may be performed contemporaneously or in a different order than as presented with respect to FIG. 25. At block 2501, method 2500 begins. At block 2510, store a set of instruction sets configured to support respective sets of message processing feature sets, wherein the set of instruction sets includes a first instruction set configured to support a first set of message processing feature sets and a second instruction set configured to support a second set of message processing feature sets, wherein the second set of message processing feature sets includes the message processing feature sets of the first set of message processing feature sets. At block 2520, process a message based on the set of instruction sets. At block 2599, method 2500 ends. In at least some example embodiments, the set of instruction sets is arranged in a hierarchy based on the respective sets of message processing feature sets such that, for a given one of the instruction sets that is at a given level of the hierarchy, the respective set of message processing feature sets supported by the given one of the instruction sets includes the sets of message processing feature sets supported by any of the instruction sets below the given level of the hierarchy. In at least some example embodiments, the message is processed using a given one of the instruction sets when processing of the message is started using the given one of the instruction sets and a determination is made, during processing of the message, that a group of message processing features sets needed for processing the message is available from the given one of the instruction sets. In at least some example embodiments, the message is processed using the first instruction set based on a determination, during processing of the message, that a group of message processing features sets needed for processing the message is available from the first instruction set. In at least some example embodiments, the message is processed using the second instruction set based on a determination, during processing of the message, that a group of message processing features sets needed for processing the message is available from the second instruction set. In at least some example embodiments, the processor is configured to switch from the second instruction set to the first instruction set, after processing of the message is complete, based on at least one of a set of packet counters or a timer. In at least some example embodiments, the message is processed using the first instruction set and the second instruction set. In at least some example embodiments, the processor is configured to switch from processing the message using the first instruction set to processing the message using the second instruction set during processing of the message. In at least some example embodiments, the switch from processing the message using the first instruction set to processing the message using the second instruction set is based on processing of the message. In at least some example embodiments, the switch from processing the message using the first instruction set to processing the message using the second instruction set is based on a determination that a given message processing feature set needed for processing the message is available from second instruction set. In at least some example embodiments, the determination that the given message processing feature set needed for processing the message is available from second instruction set is made prior to modification of the message during processing of the message using the first instruction set. In at least some example embodiments, the processor is configured to control processing of the message based on an active instruction set of the processor that is active for processing messages. In at least some example embodiments, the active instruction set is identified based on use of a pointer configured to point to a location of the active instruction set in the memory. In at least some example embodiments, the active instruction set is controlled based on a determination, during processing of the message, of a given message processing feature set needed for processing the message. In at least some example embodiments, the given message processing feature set needed for processing the message is determined based on processing of the message. In at least some example embodiments, processing of the message is completed without modifying the active instruction set based on a determination, during processing of the message, that the given message processing feature set needed for processing the message is available from the active instruction set. In at least some example embodiments, the active instruction set is modified, during processing of the message, based on a determination that the given message processing feature set needed for processing the message is not available from the active instruction set. In at least some example embodiments, the active instruction set is modified prior to modification of the message. In at least some example embodiments, processing of the message is restarted after the active instruction set is modified. In at least some example embodiments, the active instruction set is controlled based on a set of packet counters. In at least some example embodiments, the active instruction set is switched from the second instruction set to the first instruction set based on the set of packet counters. In at least some example embodiments, the active instruction set is controlled based on a timer. In at least some example embodiments, the active instruction set is switched from the second instruction set to the first instruction set based on the timer, wherein the first instruction set is at a lowest level of a hierarchy of the set of instruction sets. In at least some example embodiments, to process the message based on the set of instruction sets, the processor is configured to determine, using a configuration summary table and during processing of the message, whether the configuration summary table includes an indication that a given message processing feature set of a given one of the instruction sets is active for the set of instruction sets, switch to the given one of the instruction sets, and process the message using the given one of the instruction sets. In at least some example embodiments, the indication that the given message processing feature set of the given one of the instruction sets is active for the set of instruction sets is set into the configuration summary table based on a detection of at least one forwarding state associated with the given message processing feature set. In at least some example embodiments, the configuration summary table is used for early detection indication that the given message processing feature set of the given one of the instruction sets is active for the set of instruction sets. In at least some example embodiments, the set of instruction sets is configured to support a packet processing application, wherein a first one of the instruction sets is configured to support processing of Ethernet packets and a second one of the instruction sets is configured to support processing of Internet Protocol (IP) packets. It will be appreciated that various message processing functions presented herein with respect to FIGS. 1-23 may be incorporated within the context of method 2500 of FIG. 25.

Various example embodiments for supporting message processing based on dynamic control over processor instruction sets may provide various advantages or potential advantages. For example, various example embodiments for supporting message processing based on dynamic control over processor instruction sets may support adaptation of the instruction set used for processing messages based on features demanded by the packets to be processed. For example, various example embodiments for supporting message processing based on dynamic control over processor instruction sets may support adaptation of the instruction set used for processing messages, based on features demanded by the packets to be processed, such that, at any given point in time, features that are not needed for processing of messages are not included in the instruction set and, thus, the size of the instruction set (e.g., and its number of control instructions/blocks) are reduced or even minimized. For example, various example embodiments for supporting message processing based on dynamic control over processor instruction sets, when used by a processor used for processing packets in a forwarding plane of a network processor, may greatly improve cache efficiency and power consumption by the forwarding plane in the front-end of the processor, which results in optimal packet forwarding rate for the features exercised by the packets. Various example embodiments for supporting message processing based on dynamic control over processor instruction sets may provide various other advantages or potential advantages.

Figure 26:
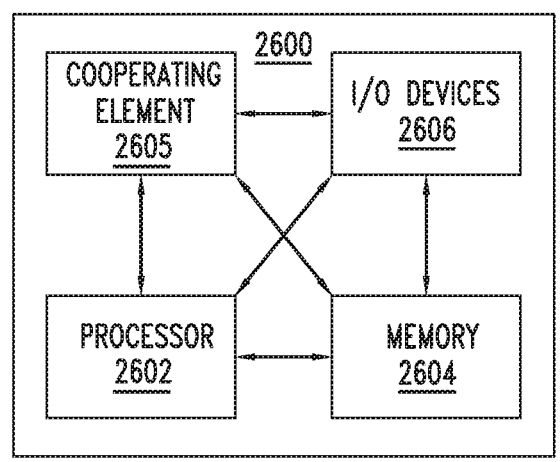
FIG. 26 depicts an example embodiment of a computer suitable for use in performing various functions presented herein.

FIG. 26 depicts an example embodiment of a computer suitable for use in performing various functions presented herein.

The computer 2600 includes a processor 2602 (e.g., a central processing unit, a processor, a processor having a set of processor cores, a processor core of a processor, or the like) and a memory 2604 (e.g., a random access memory, a read only memory, or the like). The processor 2602 and the memory 2604 may be communicatively connected. In at least some embodiments, the computer 2600 may include at least one processor and at least one memory including computer program code, wherein the at least one memory and the computer program code are configured to, with the at least one processor, cause the computer to perform various functions presented herein.

The computer 2600 also may include a cooperating element 2605. The cooperating element 2605 may be a hardware device. The cooperating element 2605 may be a process that can be loaded into the memory 2604 and executed by the processor 2602 to implement various functions presented herein (in which case, for example, the cooperating element 2605 (including associated data structures) can be stored on a non-transitory computer-readable storage medium, such as a storage device or other suitable type of storage element (e.g., a magnetic drive, an optical drive, or the like)).

The computer 2600 also may include one or more input/output devices 2606. The input/output devices 2606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2600 may represent a general architecture and functionality suitable for implementing functional elements described herein, portions of functional elements described herein, or the like, as well as various combinations thereof. For example, computer 2600 may provide a general architecture and functionality that is suitable for implementing one or more elements presented herein, such as device 100 or a portion thereof, device 700 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    a processor configured to process a message using an instruction set, wherein the processor is configured to modify a set of message processing features included in the instruction set, during processing of the message, based on a feature of the message identified during processing of the message.

2. The apparatus of claim 1, wherein the processor is configured to modify the set of message processing features included in the instruction set by switching from a first version of the instruction set to a second version of the instruction set during processing of the message.

3. The apparatus of claim 2, wherein the first version of the instruction set includes a first message processing feature set, wherein the second version of the instruction set includes the first message processing feature set and a second message processing feature set.

4. The apparatus of claim 3, wherein the processor is configured to modify the set of message processing features included in the instruction set based on a determination that the second message processing feature is needed for processing the message.

5. The apparatus of claim 2, wherein the processor is configured to switch from the first version of the instruction set to the second version of the instruction set based on modification of a pointer configured to point to a location of an active instruction set in a memory associated with the processor.

6. The apparatus of claim 1, wherein the set of message processing features included in the instruction set includes a first message processing feature set, wherein the processor is configured to modify the set of message processing features included in the instruction set by adding a second message processing feature set to the instruction set.

7. The apparatus of claim 1, wherein the processor is configured to modify the set of message processing features included in the instruction set before modification of the message during processing of the message.

8. The apparatus of claim 1, wherein the processor is configured to restart processing of the message after the set of message processing features included in the instruction set is modified.

9. The apparatus of claim 1, wherein the set of message processing features included in the instruction set includes a first message processing feature set and a second message processing feature set after the set of message processing features included in the instruction set is modified, wherein the processor is configured to further modify the set of message processing features included in the instruction set by removing the second message processing feature set from the set of message processing features included in the instruction set.

10. The apparatus of claim 9, wherein the processor is configured to further modify the set of message processing features included in the instruction set, by removing the second message processing feature set from the set of message processing features included in the instruction set, based on a set of packet counters.

11. The apparatus of claim 9, wherein the processor is configured to further modify the set of message processing features included in the instruction set, by removing the second message processing feature set from the set of message processing features included in the instruction set, based on a timer.

12. The apparatus of claim 1, wherein the instruction set is configured to support a packet processing application.

13. The apparatus of claim 12, wherein, before modifying the set of message processing features included in the instruction set, the set of message processing features in the instruction set includes a message processing feature set configured to support processing of Ethernet packets.

14. The apparatus of claim 13, wherein, after modifying the set of message processing features included in the instruction set, the set of message processing features in the instruction set includes the message processing feature set configured to support processing of Ethernet packets and a message processing feature set configured to support processing of Internet Protocol (IP) packets.

15. A method, comprising:
  modifying, by a processor configured to process a message using an instruction set, a set of message processing features included in the instruction set, during processing of the message, based on a feature of the message identified during processing of the message.

* * * * *